(12) United States Patent
Cai et al.

(10) Patent No.: US 11,958,257 B2
(45) Date of Patent: Apr. 16, 2024

(54) METHODS FOR CONSOLIDATING FIBER-REINFORCED RESIN MATERIAL

(71) Applicant: The Boeing Company, Chicago, IL (US)

(72) Inventors: Fei Cai, Edmonds, WA (US); Weidong Song, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 32 days.

(21) Appl. No.: 18/068,595

(22) Filed: Dec. 20, 2022

(65) Prior Publication Data

US 2023/0127079 A1 Apr. 27, 2023

Related U.S. Application Data

(62) Division of application No. 16/845,367, filed on Apr. 10, 2020, now Pat. No. 11,559,953.

(51) Int. Cl.
| | | |
|---|---|---|
| *B29C 70/44* | (2006.01) | |
| *B29C 70/54* | (2006.01) | |
| *B29L 31/30* | (2006.01) | |

(52) U.S. Cl.
CPC ............ *B29C 70/443* (2013.01); *B29C 70/54* (2013.01); *B29L 2031/3076* (2013.01)

(58) Field of Classification Search
CPC .............................. B29C 70/443; B29C 70/54; B29L 2031/3076
See application file for complete search history.

(56) References Cited

U.S. PATENT DOCUMENTS

| | | | | |
|---|---|---|---|---|
| 4,187,271 | A * | 2/1980 | Rolston | B29D 23/20 |
| | | | | 264/269 |
| 4,810,444 | A * | 3/1989 | Alberino | B29C 70/48 |
| | | | | 264/102 |
| 10,086,548 | B2 | 10/2018 | Song et al. | |
| 2017/0028606 | A1 | 2/2017 | Song et al. | |
| 2017/0197350 | A1 | 7/2017 | Song | |
| 2018/0370110 | A1 | 12/2018 | Song | |
| 2019/0032652 | A1* | 1/2019 | McCarthy | F04B 47/04 |
| 2021/0001575 | A1* | 1/2021 | Altan | B29C 70/48 |

FOREIGN PATENT DOCUMENTS

| | | |
|---|---|---|
| EP | 0 237 871 | 9/1987 |
| EP | 0 294 768 | 12/1988 |
| EP | 3 569 385 | 11/2019 |

* cited by examiner

*Primary Examiner* — Farah Taufiq
(74) *Attorney, Agent, or Firm* — Walters & Wasylyna LLC

(57) ABSTRACT

An apparatus for consolidating fiber-reinforced resin material comprises a housing, comprising a barrel and a receptacle. The receptacle comprises a base, a lid, positionable relative to the base and relative to the barrel such that the housing is in an open state or a closed state, and a de-gassing port. The apparatus comprises a gasket that is in contact with the lid, the base, and the barrel when the housing is in the closed state. The apparatus comprises a piston, movable between a retracted position, in which the piston, in its entirety, is in the barrel, and an extended position, in which a portion of the piston is in the receptacle and another portion of the piston is in the barrel. The apparatus comprises a seal, which is in contact with the piston and the barrel, and a drive system, configured to control movement of the piston.

20 Claims, 15 Drawing Sheets

METHODS FOR CONSOLIDATING FIBER-REINFORCED RESIN MATERIAL

PRIORITY

This application is a divisional of U.S. Ser. No. 16/845,367 filed on Apr. 10, 2020.

TECHNICAL FIELD

The subject matter, disclosed herein, relates to apparatuses and methods for consolidating fiber-reinforced resin material for extrusion.

BACKGROUND

During assembly of a structure, such as an aircraft or a component thereof, fiber-reinforced resin material is often deposited onto a surface of the structure. One technique for depositing the fiber-reinforced resin material is to extrude the fiber-reinforced resin material. However, prior to extrusion, the fiber-reinforced resin material may have internal air-pockets that result in the extruded fiber-reinforced resin material having an undesirably high porosity for some applications.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is an apparatus for consolidating fiber-reinforced resin material. The apparatus comprises a housing. The housing comprises a barrel, having a symmetry axis. The housing also comprises a receptacle. The receptacle comprises a base, extending from the barrel along the symmetry axis, and a lid, selectively positionable relative to the base of the receptacle and relative to the barrel of the housing such that the housing is in an open state or in a closed state. The receptacle also comprises a de-gassing port, configured to be selectively open or selectively closed. The apparatus also comprises a gasket that is in contact with the lid of the receptacle, the base of the receptacle, and the barrel when the housing is in the closed state. The apparatus further comprises a piston, movable along the symmetry axis between, inclusively, a retracted position, in which the piston, in its entirety, is in the barrel, and an extended position, in which a portion of the piston is in the receptacle and another portion of the piston is in the barrel. The apparatus additionally comprises a seal, which is in contact with the piston and the barrel. The apparatus also comprises a drive system, configured to selectively control movement of the piston between the retracted position and the extended position. With the housing in the open state, the lid of the receptacle is not in contact with a portion of the gasket, which is in contact with both the lid and the barrel when the housing is in the closed state. With the housing in the closed state and with the de-gassing port selectively closed, the housing and the piston form a closed chamber, hermetically sealed via the gasket and the seal.

The apparatus facilitates de-gassing and consolidating the fiber-reinforced resin material. De-gassing and consolidation of the fiber-reinforced resin material reduces or eliminates air pockets disposed within the fiber-reinforced resin material and minimizes porosity of the fiber-reinforced resin material.

Also disclosed herein is a method of consolidating an ingot of fiber-reinforced resin material. The method comprises: (1) heating the ingot to a predetermined temperature above room temperature; (2) forming a hermetically sealed chamber around the ingot; (3) applying a vacuum to the ingot in the hermetically sealed chamber; and (4) applying a force to the ingot in the hermetically sealed chamber while applying the vacuum to the ingot.

The method facilitates de-gassing and consolidating ingot of the fiber-reinforced resin material. De-gassing and consolidation of ingot reduces or eliminates air pockets disposed within ingot 110 and minimizes porosity of the fiber-reinforced resin material for a follow-on application.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
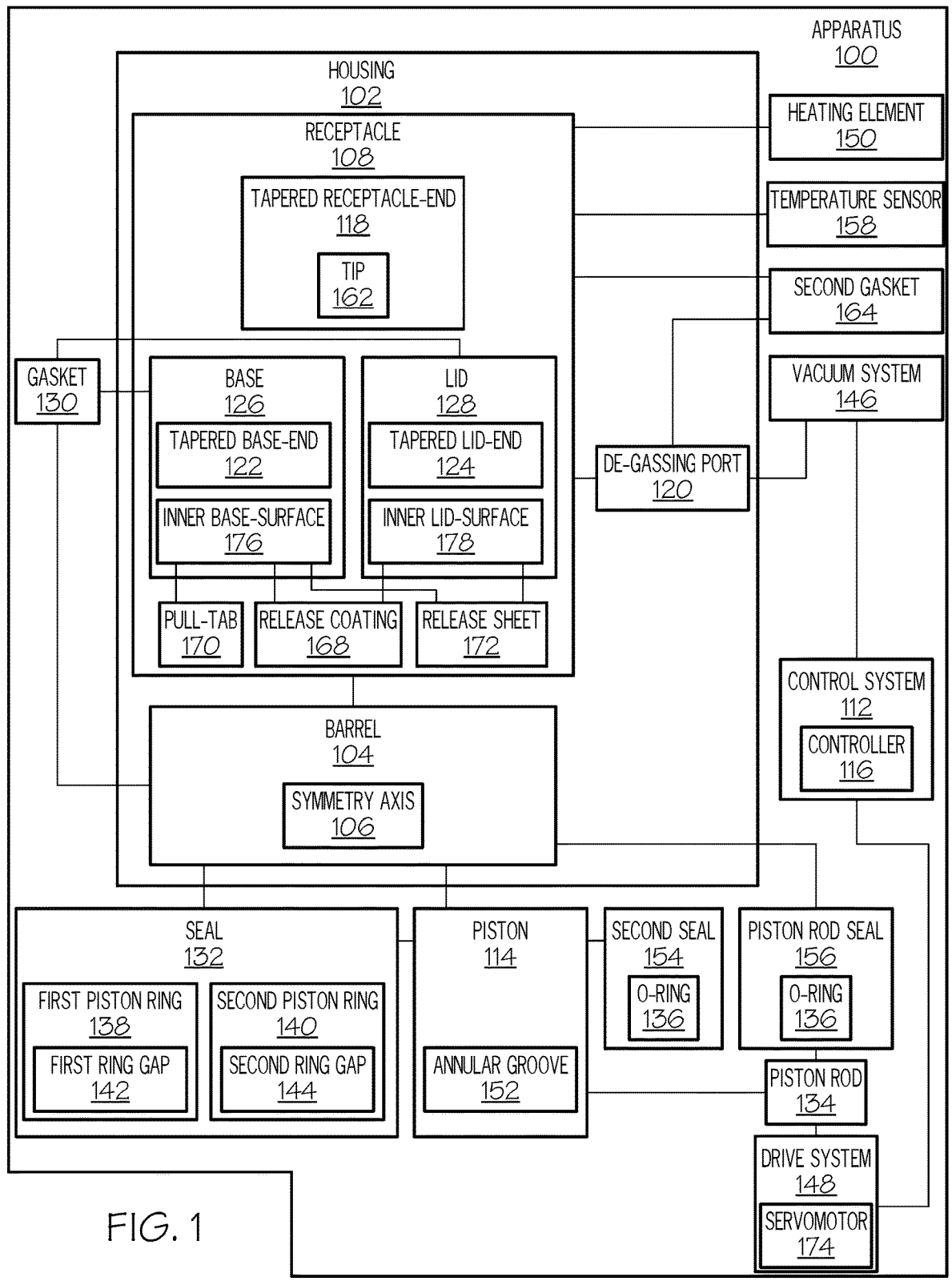
FIG. 1 is a block diagram of an apparatus for consolidating fiber-reinforced resin material, according to one or more examples of the subject matter, disclosed herein.
Figure 5:
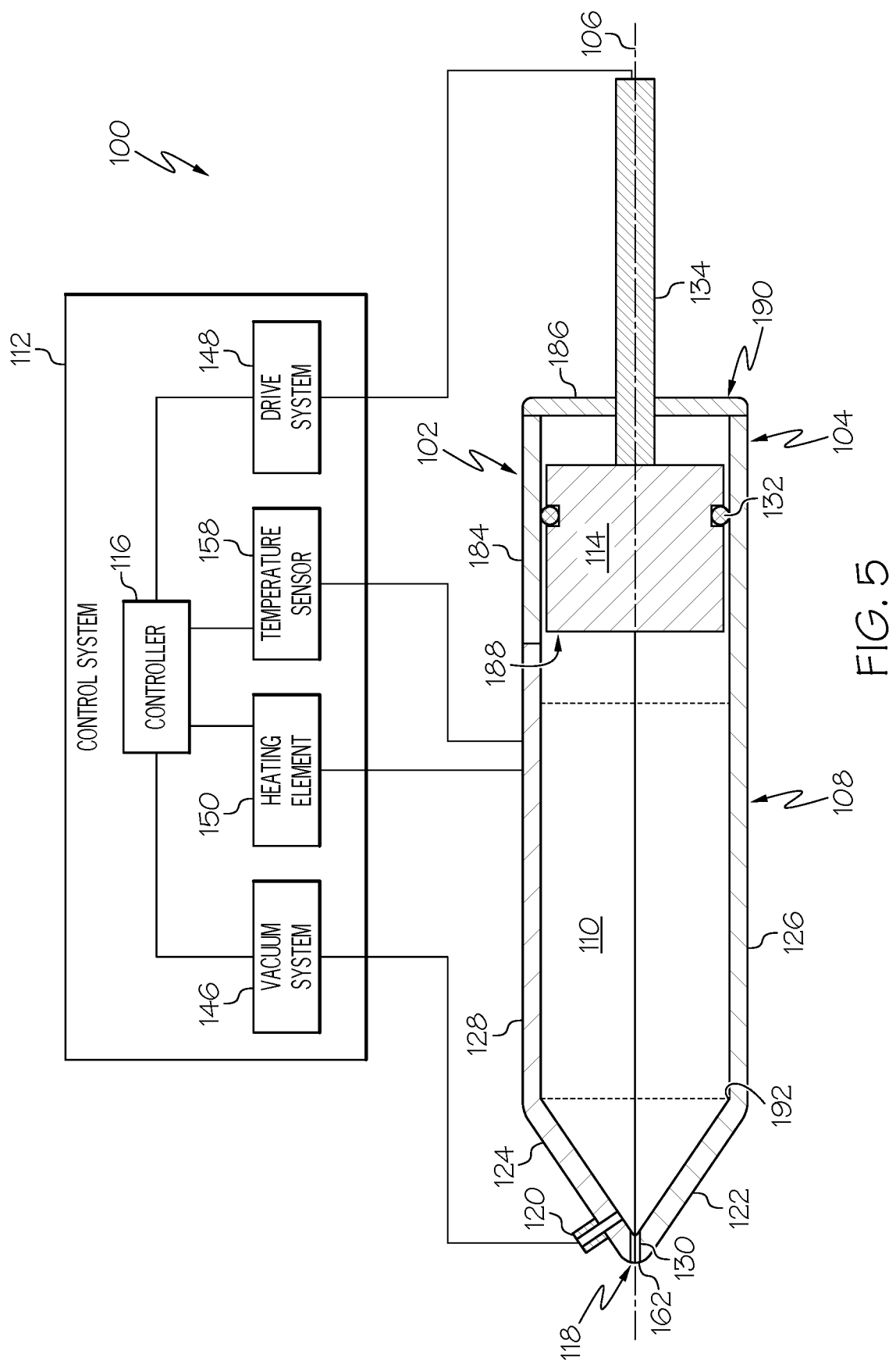
FIG. 5 is a schematic illustration of the apparatus of FIG. 1, according to one or more examples of the subject matter, disclosed herein.
Figure 6:
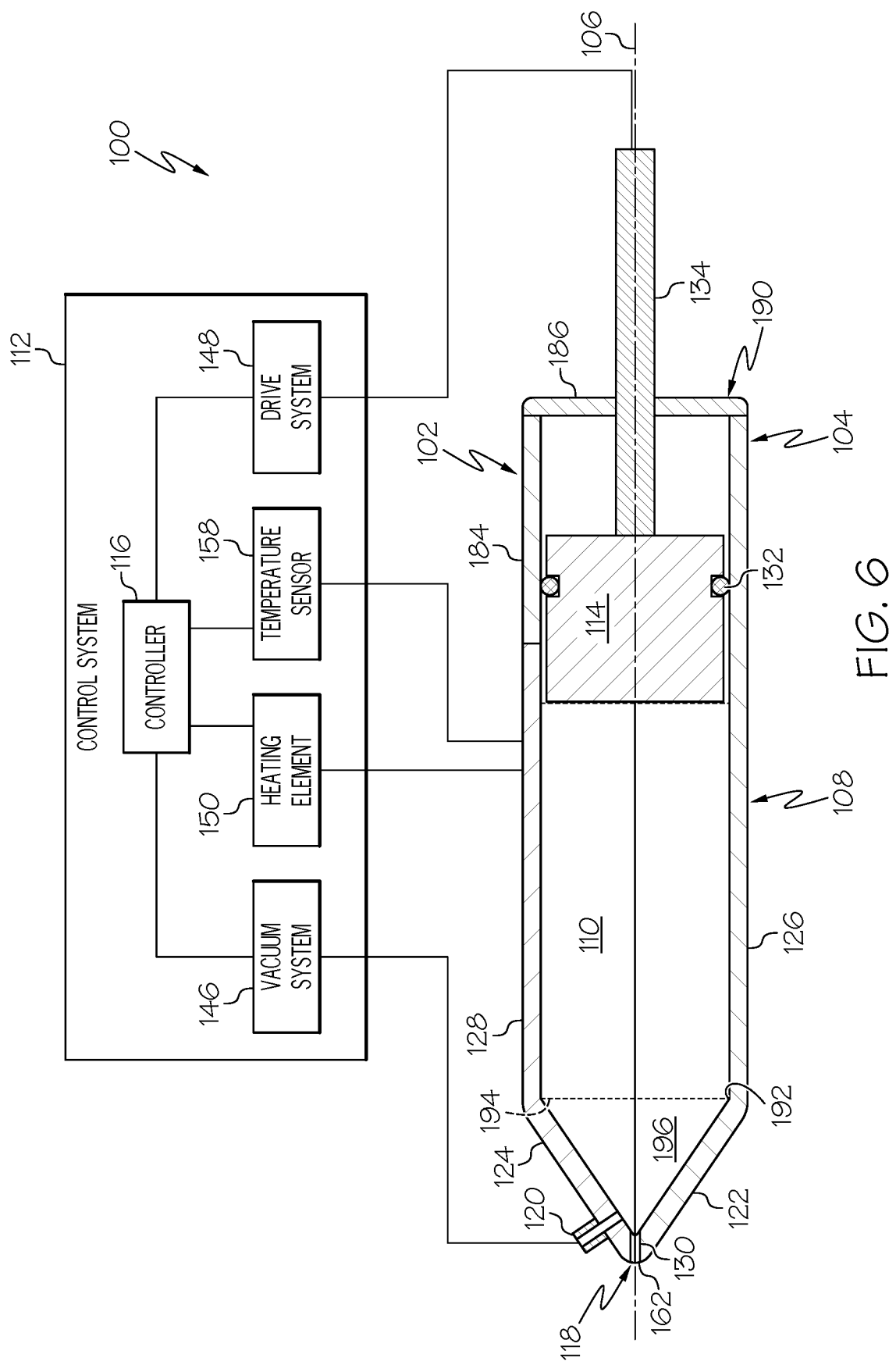
FIG. 6 is a schematic illustration of the apparatus of FIG. 1, according to one or more examples of the subject matter, disclosed herein.

In FIGS. 1, 5, and 6 referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIGS. 1, 5, and 6 may be combined in various ways without the need to include other features described in FIGS. 1, 5, and 6, other drawing figures, and/or the accompanying disclosure, even though such combination or combinations are not explicitly illustrated herein. Similarly, additional features not limited to the examples presented, may be combined with some or all of the features shown and described herein.

Figure 15:
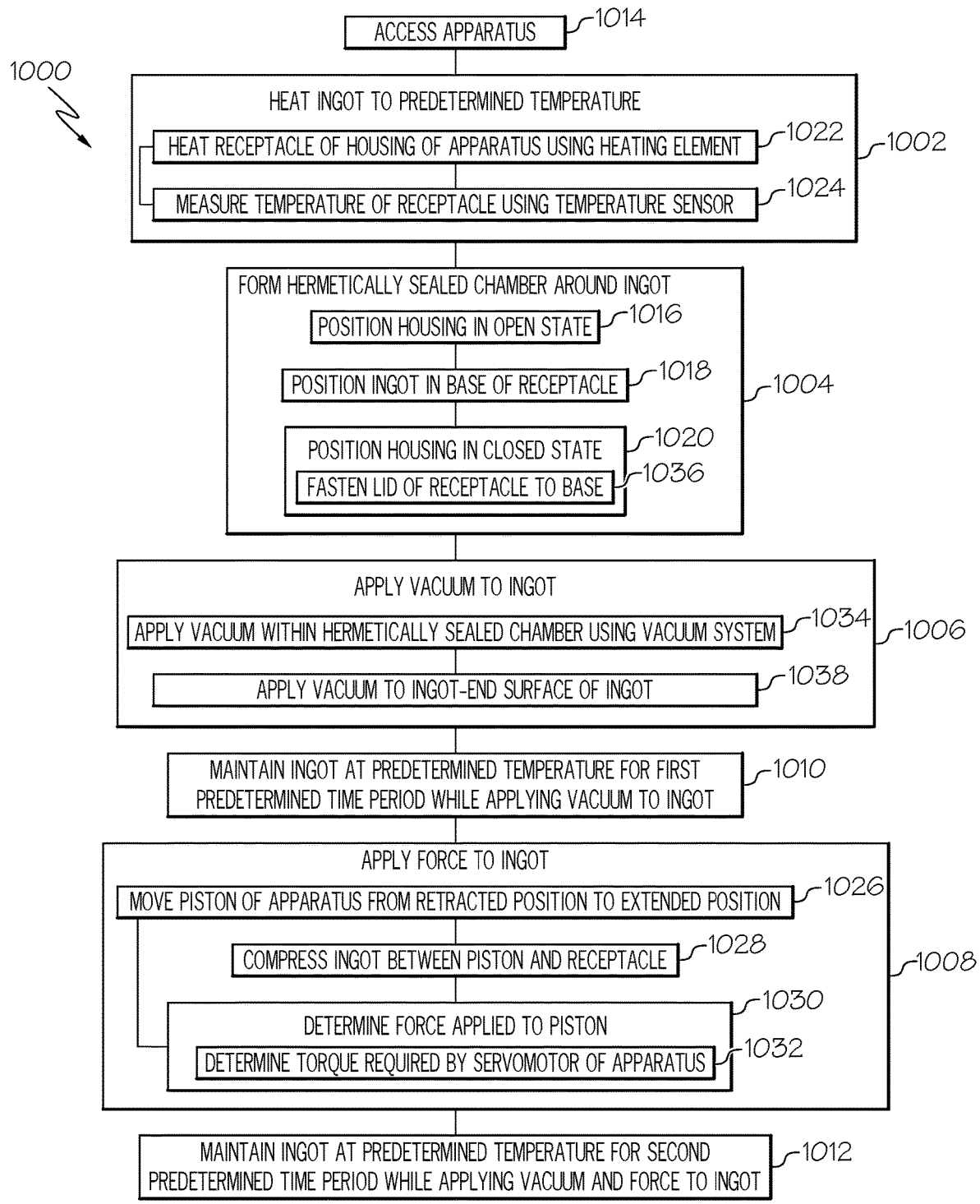
FIG. 15 is a block diagram of a method, according to one or more examples of the subject matter, disclosed herein, of consolidating an ingot of fiber-reinforced material, preferably utilizing the apparatus of FIG. 1, according to one or more examples of the subject matter, disclosed herein.
Figure 16:
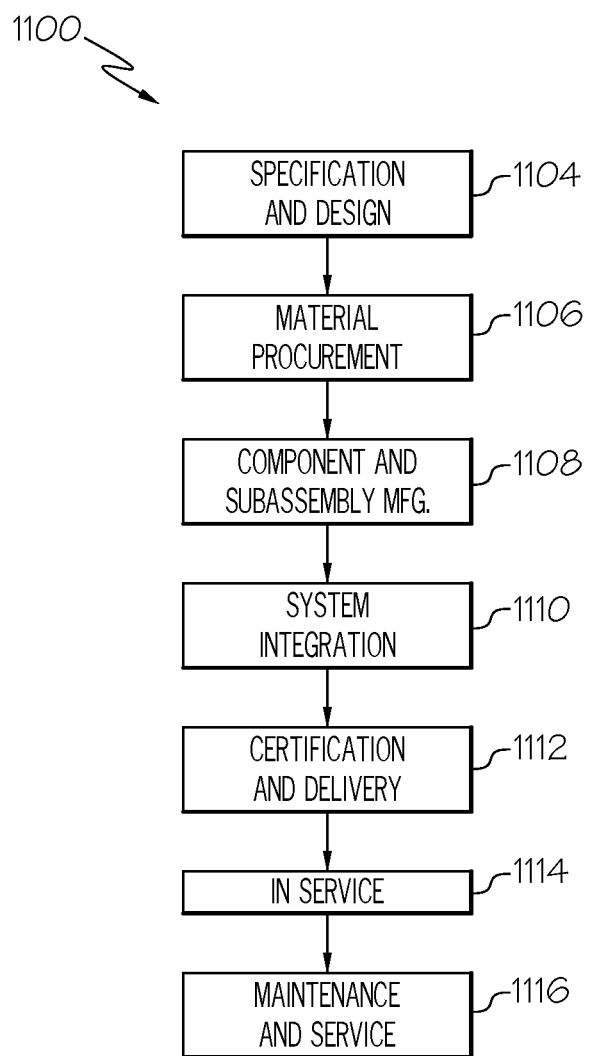
FIG. 16 is a block diagram of aircraft production and service methodology.
Figure 17:
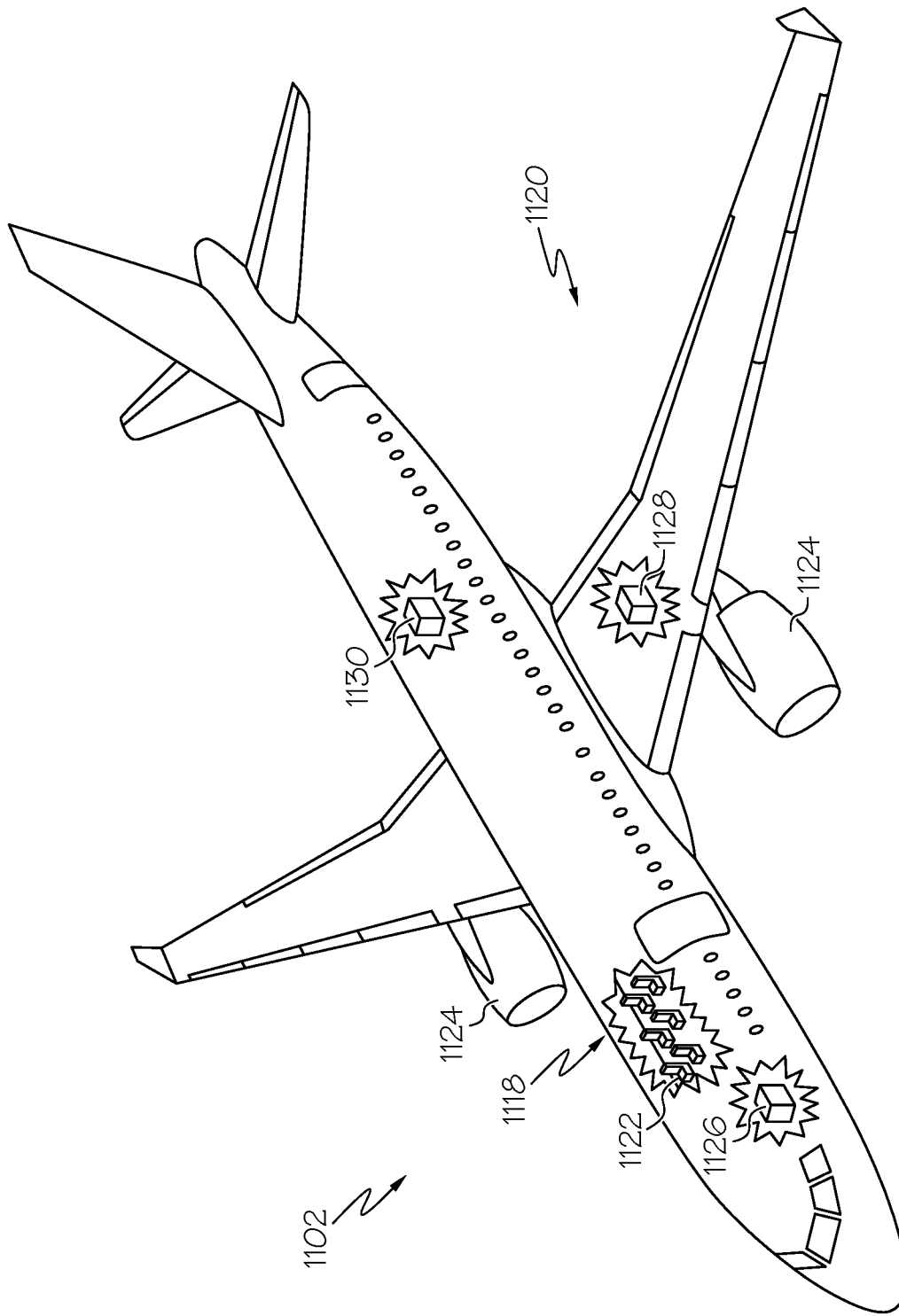
FIG. 17 is a schematic illustration of an aircraft.

In FIG. 15, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 15 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIG. 1 and particularly to, e.g., FIGS. 2-14 for illustrative purposes only and not by way of limitation, apparatus 100 for consolidating fiber-reinforced resin material is disclosed. Apparatus 100 comprises housing 102, comprising barrel 104, having symmetry axis 106. Apparatus 100 also comprises receptacle 108. Receptacle 108 comprises base 126, extending from barrel 104 along symmetry axis 106, and lid 128, selectively positionable relative to base 126 of receptacle 108 and relative to barrel 104 of housing 102 such that housing 102 is in an open state or in a closed state. Receptacle 108 also comprises degassing port 120, configured to be selectively open or selectively closed. Apparatus 100 also comprises gasket 130 that is in contact with lid 128 of receptacle 108, base 126 of receptacle 108, and barrel 104 when housing 102 is in the closed state. Apparatus 100 further comprises piston 114, movable along symmetry axis 106 between, inclusively, a retracted position, in which piston 114, in its entirety, is in barrel 104, and an extended position, in which a portion of piston 114 is in receptacle 108 and another portion of piston 114 is in barrel 104. Apparatus 100 additionally comprises seal 132, which is in contact with piston 114 and barrel 104.

Apparatus 100 also comprises drive system 148, configured to selectively control movement of piston 114 between the retracted position and the extended position. With housing 102 in the open state, lid 128 of receptacle 108 is not in contact with a portion of gasket 130, which is in contact with both lid 128 and barrel 104 when housing 102 is in the closed state. With housing 102 in the closed state and with de-gassing port 120 selectively closed, housing 102 and piston 114 form a closed chamber, hermetically sealed via gasket 130 and seal 132. The preceding portion of this paragraph characterizes example one of the subject matter, disclosed herein.

Apparatus 100 facilitates de-gassing and consolidating the fiber-reinforced resin material. De-gassing and consolidation of the fiber-reinforced resin material reduces or eliminates air pockets disposed within the fiber-reinforced resin material and minimizes porosity of the fiber-reinforced resin material.

During assembly of certain types of structures, such aircraft or components therefore, fiber-reinforced resin material is deposited on a surface of the structure. For example, the fiber-reinforced resin material is extruded onto the surface of the structure in near net shape using an extrusion machine. Once cured, the fiber-reinforced resin material forms an integral portion of an assembled structure. For example, the extruded fiber-reinforced resin material forms a radius filler of a composite stringer or other composite structure of the aircraft. Prior to extrusion, air pockets are often distributed throughout the fiber-reinforced resin material. In certain cases, the extrusion machine does not effectively eliminate the air pockets within the fiber-reinforced resin material during the extrusion process, resulting in the extruded fiber-reinforced resin material having an undesirably high level of porosity for some applications.

Figure 3:
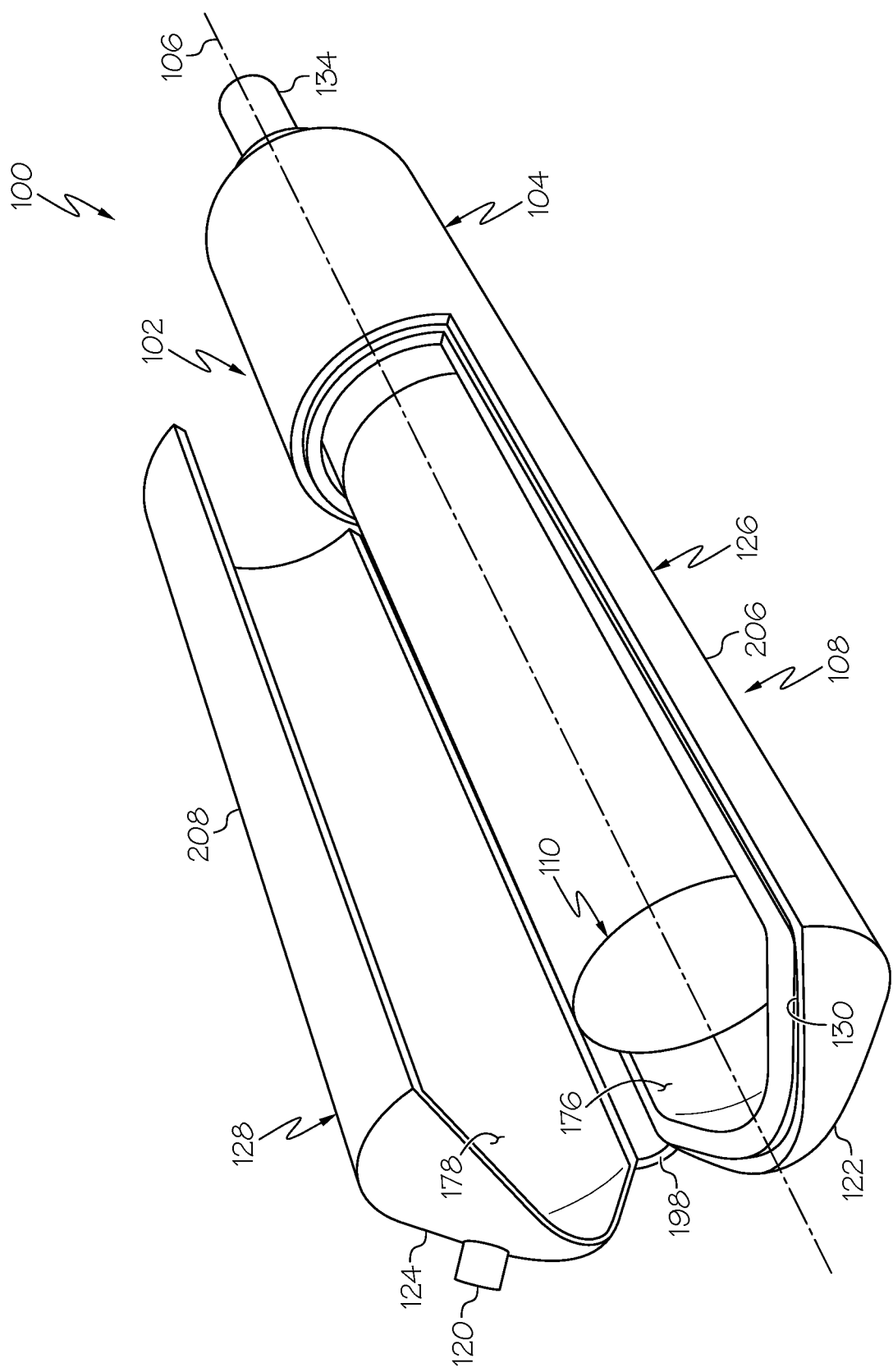
FIG. 3 is a schematic, perspective view of the apparatus of FIG. 1 and an ingot of fiber-reinforced resin material, located within the housing of the apparatus, according to one or more examples of the subject matter, disclosed herein.

As best illustrated in FIG. 3, in one or more examples, the fiber-reinforced resin material is produced in the form of ingot 110. Ingot 110 has a size and a shape, suitable for use with one or more types of extrusion machines. In one or more examples, ingot 110 has a cylindrical shape. In one or more examples, ingot 110 has a cross section (when viewed along a longitudinal axis of ingot 110) that is circular, elliptical, parabolic, or hyperbolic. In one or more examples, ingot 110 has a diameter of approximately 4 inches (10 cm) and a length of approximately 12 inches (30.5 cm).

The extrusion machine is configured to hold ingot 110 of the fiber-reinforced resin material and to extrude ingot 110 to a desired geometry and dimension for application to the surface of the structure. Examples of apparatus 100, disclosed herein, promote effective de-gassing and consolidation of ingot 110 prior to being loaded into the extrusion machine, which eliminates or greatly reduces the air pockets and porosity of ingot 110 prior to extrusion. Accordingly, the porosity of the extruded fiber-reinforced resin material is eliminated or greatly reduced.

In one or more examples, barrel 104 and receptacle 108 are made of a metallic material, such as stainless steel, that is capable of withstanding the pressure and temperature used during consolidating and de-gassing ingot 110. In one or more examples, barrel 104 is a monolithic structure. In one or more examples, barrel 104 and base 126 of receptacle 108 form a monolithic structure.

In one or more examples, with housing 102 is in the closed state, receptacle 108 is cylindrical and the smallest cross-section of receptacle 108 is circular, elliptical, parabolic, or hyperbolic. In these examples, each one of base 126 and lid 128 is semi-cylindrical. In one or more examples, base 126 includes semi-cylindrical base-portion 206 extending along symmetry axis 106 and lid 128 includes semi-cylindrical lid-portion 208 extending along symmetry axis 106. With housing 102 in the closed state, semi-cylindrical base-portion 206 and semi-cylindrical lid-portion 208 collectively form cylindrical receptacle-portion 210 of receptacle 108.

Barrel 104 is configured to retain piston 114 and enable movement of piston 114 along symmetry axis 106 during de-gassing and consolidation. In one or more examples, barrel 104 is cylindrical and the smallest cross-section of barrel 104 is circular, elliptical, parabolic, or hyperbolic. In one or more examples, barrel 104 has an azimuthal symmetry about symmetry axis 106. As used herein, azimuthal symmetry refers to rotational symmetry of order n, where n equal infinity with respect to a point, in two dimensions, or an axis, in three dimensions.

Piston 114 has a cross section that is complementary to the smallest cross section of barrel 104 such that piston 114 moves within barrel 104 and seal 132 is in contact with piston 114 and barrel 104. In one or more examples, piston 114 is made of a metallic material that is capable of withstanding the pressure and temperature used during consolidating and de-gassing ingot 110. In one or more examples, piston 114 is made of a metallic alloy, such as a copper-aluminum alloy, such as AMPCO® 18 commercially available from AMPCO METAL SA.

Figure 2:
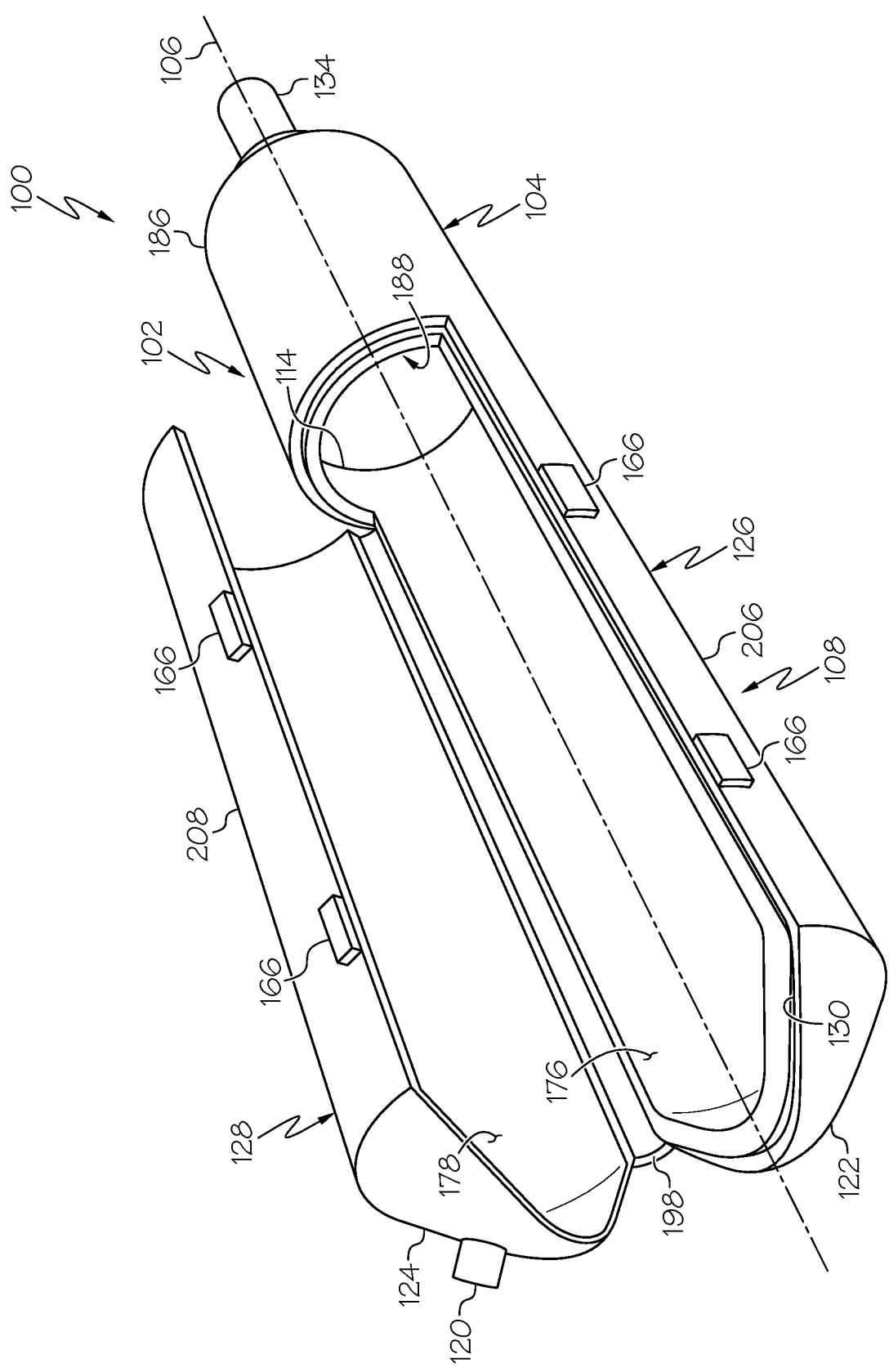
FIG. 2 is a schematic, perspective view of the apparatus of FIG. 1 with a housing of the apparatus in an open state, according to one or more examples of the subject matter, disclosed herein.
Figure 4:
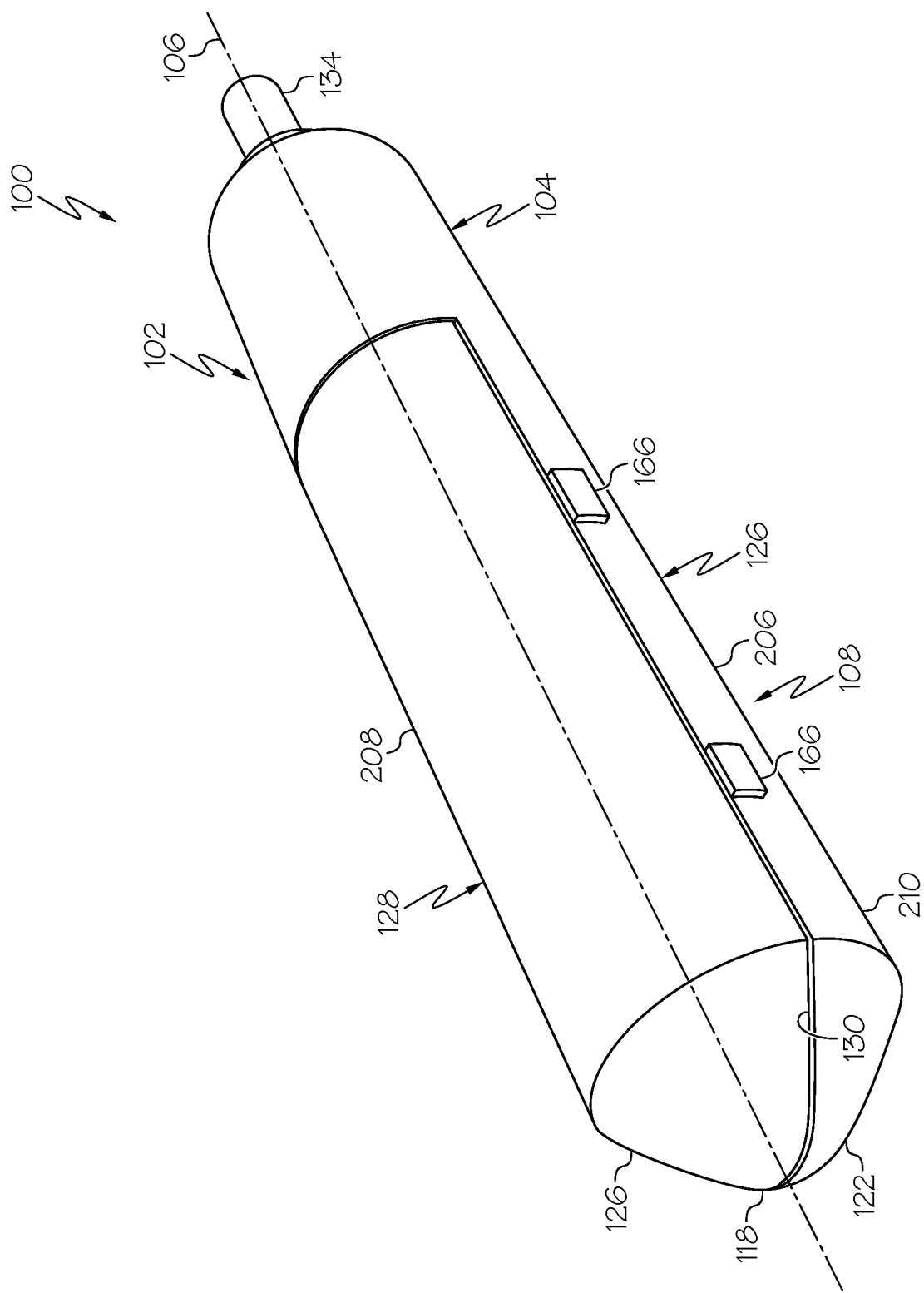
FIG. 4 is a schematic, perspective view of the apparatus of FIG. 1 with the housing of the apparatus in a closed state, according to one or more examples of the subject matter, disclosed herein.

With housing 102 in the open state, receptacle 108 is configured to receive ingot 110 of the fiber-reinforced resin material, as illustrated in FIGS. 2 and 3. For example, with housing 102 in the open state, ingot 110 is positioned in base 126 of receptacle 108. With housing 102 in the closed state, receptacle 108 is configured to hold ingot 110 during consolidation and de-gassing, as illustrated in FIGS. 4-6. For example, with housing 102 in the closed state, lid 128 is appropriately positioned relative to base 126 such that ingot 110 is enclosed within receptacle 108. With housing 102 in the closed state, housing 102 and piston 114 form the closed chamber, within which ingot 110 is enclosed during de-gassing and consolidation. With housing 102 in the closed state, receptacle 108 and barrel 104 are in volumetric communication. Forming and hermetically dealing the closed chamber around ingot 110 provides a suitable processing environment for vacuum de-gassing and consolidation of ingot 110.

Base 126 and lid 128 have any one of various configurations suitable to enable housing 102 to be positioned in the open state or in the closed state. Regardless of the configuration of lid 128 and base 126, receptacle 108 is configured such that lid 128 and base 126 are hermetically sealed via gasket 130 when housing 102 in the closed state.

In one or more examples, lid 128 remains coupled to base 126 when housing 102 is in the open state and in the closed state. In these examples, lid 128 is movable relative to base 126 to position housing 102 in the open state or in the closed state.

In one or more examples, as illustrated in FIGS. 2-4, lid 128 is coupled to base 126 via hinge 198 and is pivotally moveable relative to base 126 to position housing 102 in the open state or in the closed state. In one or more examples, hinge 198 extends along one side of receptacle 108 at an interface between lid 128 and base 126. In these examples, base 126 and lid 128 form a clamshell configuration.

In one or more examples, lid 128 is coupled to base 126 via a slide mechanism and is linearly movable along symmetry axis 106 relative to base 126 to position housing 102 in the open state or in the closed state. In one or more examples, the slide mechanism includes any structure than enables lid 128 to move linearly relative to base 126, such as a rail assembly or an integral tongue and groove assembly. In these examples, lid 128 forms a sliding door.

In one or more examples, lid 128 and base 126 are separate components. In these examples, lid 128 is removable from base 126 to position housing 102 in the open state and is coupled to base 126 to position housing 102 in the closed state.

With housing 102 in the closed state, gasket 130 creates a gas-tight seal at an interface between base 126 and lid 128 and a gas-tight seal at an interface between lid 128 and barrel 104. The interface between base 126 and lid 128 is located along a perimeter of base 126 and a portion of a perimeter of lid 128. The interface between barrel 104 and lid 128 is located along a perimeter of barrel 104 and a portion of the perimeter of lid 128.

Figure 14:
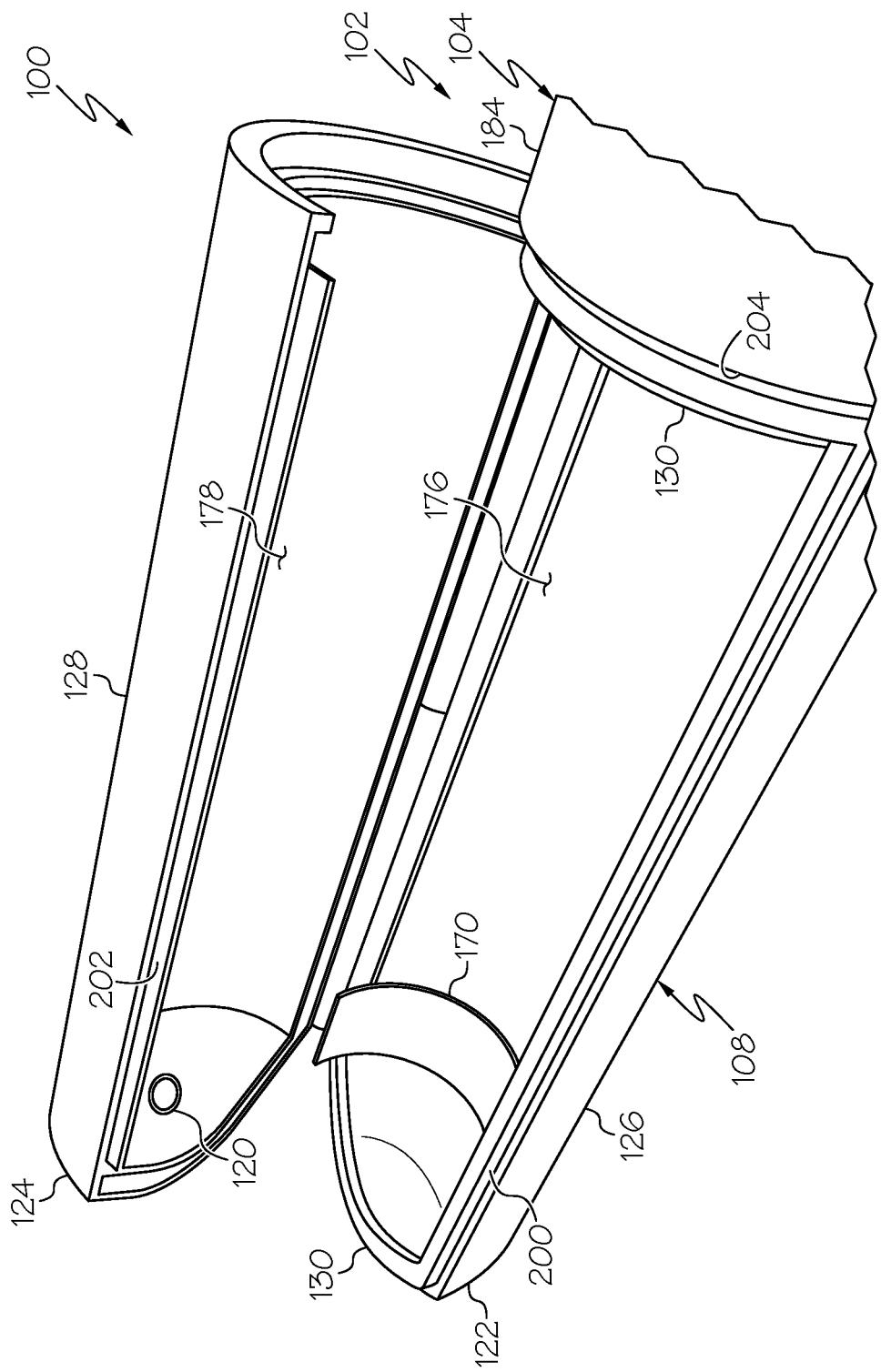
FIG. 14 is a schematic, perspective view of a portion of the apparatus of FIG. 1, according to one or more examples of the subject matter, disclosed herein.

In one or more examples, as illustrated in FIGS. 2, 3, and 14, gasket 130 is located on and extends along the perimeter of base 126 and the perimeter of barrel 104 such that gasket 130 is in contact with lid 128, base 126, and barrel 104 when housing 102 is in the closed state. With housing 102 in the closed state, a portion of gasket 130 is in direct contact with lid 128 and with base 126 such that a hermetic seal is formed between lid 128 and base 126 and another portion of gasket 130 is in direct contact with lid 128 and with barrel 104 such that a hermetic seal is formed between lid 128 and barrel 104. As used herein, direct contact refers to immediate touching contact between items without any intermediate element being situated between the items, such as used to form a hermetic seal.

Figure 13:
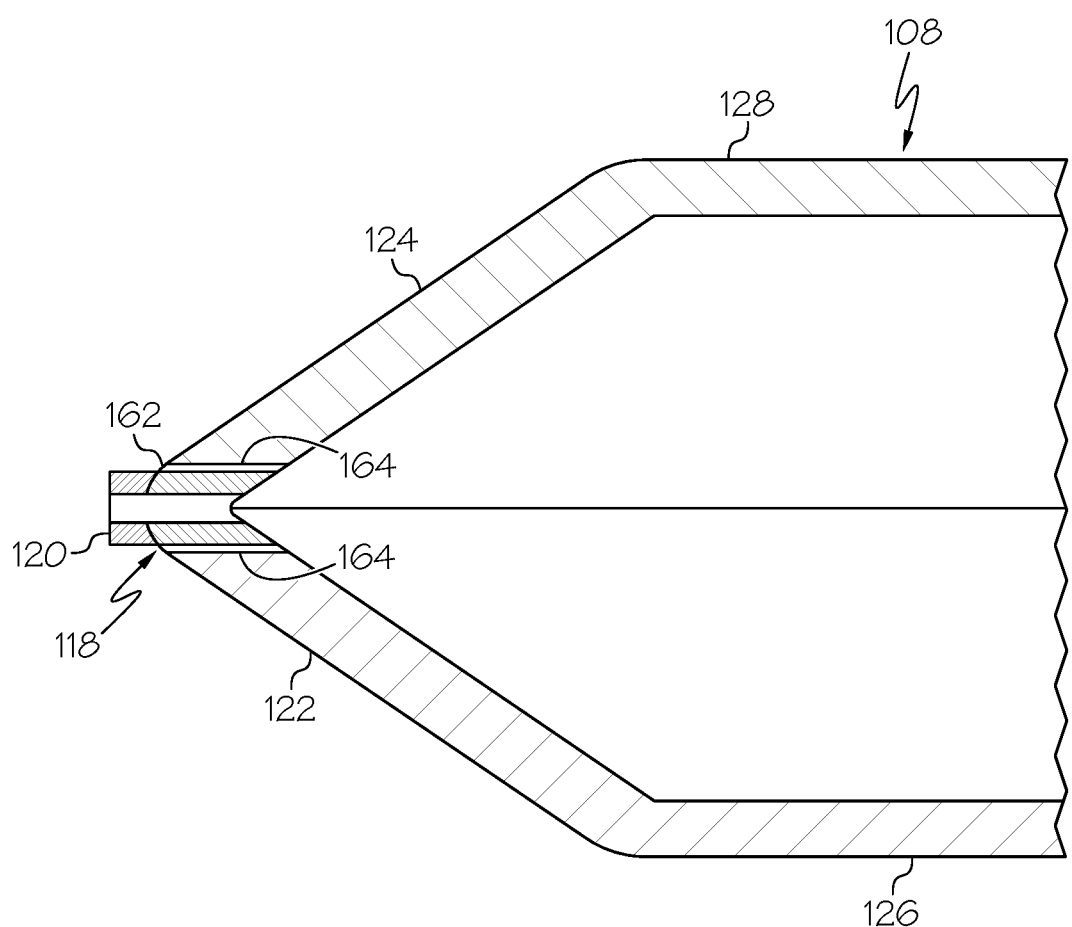
FIG. 13 is a schematic, elevation, sectional view of a portion of the apparatus of FIG. 1, according to one or more examples of the subject matter, disclosed herein.

In one or more examples, as illustrated in FIGS. 2, 3, and 13, a portion of gasket 130 is coupled to the perimeter of base 126 and a portion of gasket 130 is coupled to the perimeter of barrel 104. In one or more examples, as illustrated in FIG. 13, base 126 includes base groove 200 that extends along the perimeter of base 126 within which a portion of gasket 130 is positioned. In one or more examples, barrel 104 includes barrel groove 204 that extends along the perimeter of barrel 104 within which a portion of gasket 130 is positioned. In one or more examples, lid 128 includes lid groove 202 that extends along the perimeter of lid 128 within which gasket 130 is positioned when housing 102 is in the closed state.

Gasket 130 has any one of various cross-sectional geometries, such as circular, square, and the like. Gasket 130 is made of any suitable material that is heat-resistance and capable of maintaining the hermetic seal in response to high pressure. In one or more examples, gasket 130 is made of a synthetic rubber, such as a fluoropolymer elastomer, e.g. Viton™.

With piston 114 in the retracted position, as illustrated in FIGS. 3 and 5, seal 132 (FIG. 5) creates a gas-tight seal at an interface between piston 114 and barrel 104. With piston 114 in the extended position, as illustrated in FIG. 6, seal 132 creates the gas-tight seal at the interface between piston 114 and barrel 104. Seal 132 remains within barrel 104 throughout the stroke of piston 114 and maintains the gas-tight seal at the interface between piston 114 and barrel 104 during movement of piston 114 along symmetry axis 106.

In one or more examples, as illustrated in FIGS. 5-9, seal 132 is located on and extends around a circumference of piston 114 such that seal 132 is in contact with piston 114 and barrel 104. Seal 132 is in direct contact with piston 114 and is in direct contact with barrel 104 such that a hermetic seal is formed between piston 114 and barrel 104.

In one or more examples, with housing 102 in the closed state and with de-gassing port 120 selectively open, vacuum can be applied within the closed chamber via de-gassing port 120. The vacuum applied within the closed chamber results in the vacuum being applied to ingot 110. In one or more examples, the vacuum applied within the closed chamber facilitates evacuation of gas, such as air and/or other volatiles, released from ingot 110 during consolidation from within the closed chamber via de-gassing port 120.

In one or more examples, with housing 102 in the closed state and with de-gassing port 120 selectively open, the vacuum can be applied within the closed chamber via de-gassing port 120, and a force can be applied to ingot 110. With piston 114 in the extended position, as illustrated in FIG. 6, piston 114 facilitates application of the force to ingot 110 situated within the closed chamber, which results in application of a positive pressure to ingot 110.

Referring generally to FIG. 1 and particularly to, e.g., FIGS. 5 and 6 for illustrative purposes only and not by way of limitation, apparatus 100 further comprises control system 112 that comprises controller 116, configured to selectively control at least one of temperature within the closed chamber, vacuum within the closed chamber, and force, applied to piston 114 by drive system 148. The preceding portion of this paragraph characterizes example two of the subject matter, disclosed herein, where example 2 also encompasses example one, above.

Control system 112 facilitates a closed-loop control environment in which consolidation and de-gassing of ingot 110 is performed via selective control of a plurality of processing parameters, such as time, temperature, and pressure.

Controlling the temperature within the closed chamber enables softening and otherwise preparing ingot 110 for vacuum de-gassing and consolidation. Controlling the vacuum within the closed chamber enables lowering pressure within the closed chamber to expose a surface of ingot 110 to the vacuum and remove gas, such as air, from a boundary layer of ingot 110. Controlling the force applied to piston 114 enables compacting ingot 110 to urge gas trapped within ingot 110 toward the boundary layer for vacuum de-gassing.

In one or more examples, drive system 148 is operatively coupled with controller 116. Controller 116 is configured to selectively control the force applied to piston 114 by drive system 148. In one or more examples, drive system 148 supplies operational power and provides selective control to move piston 114 between the retracted position and the extended position by applying the force to piston 114. Piston 114 is configured to apply a force to ingot 110 when moved along symmetry axis 106 from the retracted position to the extended position. The force applied to piston 114 by drive system 148 is equal to the force applied to ingot 110 by piston 114.

With piston 114 in the retracted position, an entirety of piston 114 is in barrel 104, as illustrated in FIG. 5. As piston 114 advances from the retracted position toward the extended position, a portion of piston 114 extends into receptacle 108 until piston 114 contacts ingot 110. As piston 114 further advances toward the extended position, a greater portion of piston 114 extends into receptacle 108 as piston 114 applies the force to ingot 110 to compress ingot 110 between piston 114 and receptacle 108. With piston 114 in the extended position, a portion of piston 114 is in barrel 104 and a portion of piston 114 is in receptacle 108, as illustrated in FIG. 6. In one or more examples, piston 114 moves approximately ½ inch (12.7 mm) from the retracted position to the extended position.

Applying the force to ingot 110 in the closed chamber using piston 114 compacts ingot 110 and urges gas trapped within ingot 110 toward the boundary layer for vacuum de-gassing. Accordingly, selective control of the force applied to piston 114 by drive system 148 enables selective control of the force applied to ingot 110 by piston 114. In one or more examples, the force, applied to ingot 110, results in a pressure in the range of 600 psi to 1,000 psi, applied to the ingot 110.

Drive system 148 includes various operational components, such as a drive component and a power-transmission component. The drive component is configured to generate the force that is applied to piston 114. The power-transmission component is coupled to the drive component and to piston 114 and is configured to transfer the force from the drive component to piston 114. In one or more examples, drive system 148 is a mechanical actuator, a hydraulic actuator, or a pneumatic actuator. In one or more examples, the drive component is a stepper motor, a hydraulic motor, or a pneumatic motor.

Referring generally to FIG. 1 and particularly to, e.g., FIGS. 5 and 6 for illustrative purposes only and not by way of limitation, apparatus 100 further comprises vacuum system 146, coupled to de-gassing port 120. With de-gassing port 120 selectively open, vacuum system 146 is selectively controlled to apply vacuum within the closed chamber. The preceding portion of this paragraph characterizes example three of the subject matter, disclosed herein, where example three also encompasses example two, above.

Vacuum system 146 provides for application of the vacuum within the closed chamber via de-gassing port 120. The vacuum applied within the closed chamber results in application of vacuum to at least a portion of a surface of ingot 110. Vacuum system 146 also provides for evacuation of gas from within the closed chamber via de-gassing port 12, such as air and/or other volatiles that escapes from ingot 110 during consolidation.

In one or more examples, vacuum system 146 is operatively coupled with controller 116. Controller 116 is configured to selectively control the vacuum applied to the close chamber and, thus, to ingot 110 by vacuum system 146. Applying the vacuum to ingot 110 in the hermetically sealed closed chamber using vacuum system 146 lowers the pressure inside the hermetically sealed chamber, exposes the surface of ingot 110 to the vacuum, and removes gas, such as air, from a boundary layer of ingot 110. Accordingly, selective control of vacuum system 146 enables selective control of the vacuum applied to ingot 110 within the closed chamber. In one or more examples, the vacuum, applied to the ingot 110, is between approximately −28 in-Hg and −30 in-Hg.

Vacuum system 146 includes various operational components, such as a vacuum pump and a vacuum regulator. The vacuum pump is configured to remove gas from within the closed chamber in order to produce the vacuum. The regulator is configured to control the vacuum, generated by the vacuum pump and applied to the closed chamber via de-gassing port 120. In one or more examples, vacuum system 146 is coupled to de-gassing port 120 such that de-gassing port 120 enables vacuum system 146 to be fluid communication with the closed chamber. In one or more examples, de-gassing port 120 is a one-way valve. Accordingly, with de-gassing port 120 selectively open, vacuum system 146 is in fluidic communication with the closed chamber.

Referring generally to FIG. 1 and particularly to, e.g., FIGS. 5 and 6 for illustrative purposes only and not by way of limitation, drive system 148 comprises servomotor 174, coupled to piston 114. Servomotor 174 is operatively coupled with controller 116. Controller 116 is configured to determine the force, applied to piston 114, from torque, required by servomotor 174. The preceding portion of this paragraph characterizes example four of the subject matter, disclosed herein, where example four also encompasses example two or three, above.

Servomotor 174 enables the force applied to ingot 110 by piston 114 to be determined without the use of a sensor. Servomotor 174 is an example of the drive component of drive system 148. In one or more examples, controller 116 is configured to determine a torque, required by servomotor 174. The force applied to piston 114 by drive system 148 is determined from the torque required by servomotor 174 or is selectively controlled by the torque applied to servomotor 174, such as based on a look-up table. The force applied to piston 114 by drive system 148 is equal to the force applied to ingot 110 by piston 114.

Alternatively, in one or more examples, apparatus 100 includes a sensor, configured to measure at least one of the force applied to piston 114 by drive system 148, the force applied to ingot 110 by piston 114, and the pressure applied to ingot 110 resulting from compression by piston 114. In these examples, the sensor is utilized when the drive component of drive system 148 is a hydraulic motor or pneumatic motor.

Referring generally to FIG. 1 and particularly to, e.g., FIGS. 5 and 6 for illustrative purposes only and not by way of limitation, apparatus 100 further comprises heating element 150 in thermal communication with receptacle 108. Heating element 150 is operatively coupled with controller 116, which is configured to selectively control heating element 150 to heat receptacle 108. The preceding portion of this paragraph characterizes example five of the subject matter, disclosed herein, where example five also encompasses any one of examples two to four, above.

Heating element 150 provides for application of heat to receptacle 108 and facilitates heating of ingot 110 within the closed chamber to a predetermined temperature above room temperate. Heating of ingot 110 enables the fiber-reinforced resin material to become sufficiently soft to respond to subsequent vacuum de-gassing and consolidation.

Selective control of heating element enables selective control of the temperature of ingot 110 within the closed chamber. Heating ingot 110 to a predetermined temperature above room temperature using heating element 150 softens and otherwise prepares ingot 110 for vacuum de-gassing and consolidation. In one or more examples, ingot 110 is heated to the predetermined temperature of between approximately 120 degrees and 150 degrees Fahrenheit.

In one or more examples, heating element 150 is a resistive heating element. For example, heating element 150 is a heat blanket, configured to be positioned around at least a portion of receptacle 108. In one or more examples, heating element 150 is a gas heating element, configured to direct gas heat to receptacle 108. Other types of heating elements are also contemplated.

In one or more examples, receptacle 108 is made of a thermally conductive material such that heat produced by heating element 150 is efficiently and effectively transferred through receptacle 108 to ingot 110 positioned within the closed chamber.

Referring generally to FIG. 1 and particularly to, e.g., FIGS. 5 and 6 for illustrative purposes only and not by way of limitation, apparatus 100 further comprises temperature sensor 158, coupled to receptacle 108. Temperature sensor 158 is operatively coupled with controller 116. Temperature sensor 158 is configured to measure the temperature within the closed chamber. The preceding portion of this paragraph characterizes example six of the subject matter, disclosed herein, where example six also encompasses any one of examples two to five, above.

Temperature sensor 158 enables controller 116 to monitor and selectively control the temperature within the closed chamber and, thus, the temperature of ingot 110. In one or more examples, controller 116 selectively controls heating element 150 to adjust the heat applied to receptacle 108 based on temperature measurements from temperature sensor 158. In one or more examples, temperature sensor 158 is a thermocouple that is coupled to receptacle 108.

Referring generally to FIG. 1 and particularly to, e.g., FIGS. 7-10 for illustrative purposes only and not by way of limitation, seal 132 comprises first piston ring 138, fixed relative to piston 114 along symmetry axis 106, and second piston ring 140, fixed relative to piston 114 along symmetry axis 106. The preceding portion of this paragraph characterizes example seven of the subject matter, disclosed herein, where example seven also encompasses any one of examples one to six, above.

First piston ring 138 and second piston ring 140 create a gas-tight seal between piston 114 and barrel 104. First piston ring 138 and second piston ring 140 being fixed relative to piston 114 along symmetry axis 106 enables first piston ring 138 and second piston ring 140 to move with piston 114 and relative to barrel 104.

First piston ring 138 and second piston ring 140 seal a gap between an outer diameter of piston 114 and an inner wall of barrel 104. In combination, first piston ring 138 and second piston ring 140 minimize leakage of pressure past first piston ring 138 or second piston ring 140. In one or more examples, in response to application of vacuum within the closed chamber, each one of first piston ring 138 and second piston ring 140 expand radially against the inner wall of barrel 104 to create the gas-tight seal at an interface between first piston ring 138 and barrel 104 and at an interface between second piston ring 140 and barrel 104. In one or more examples, each one of first piston ring 138 and second piston ring 140 is made of a metallic material, such as steel.

Figure 10:
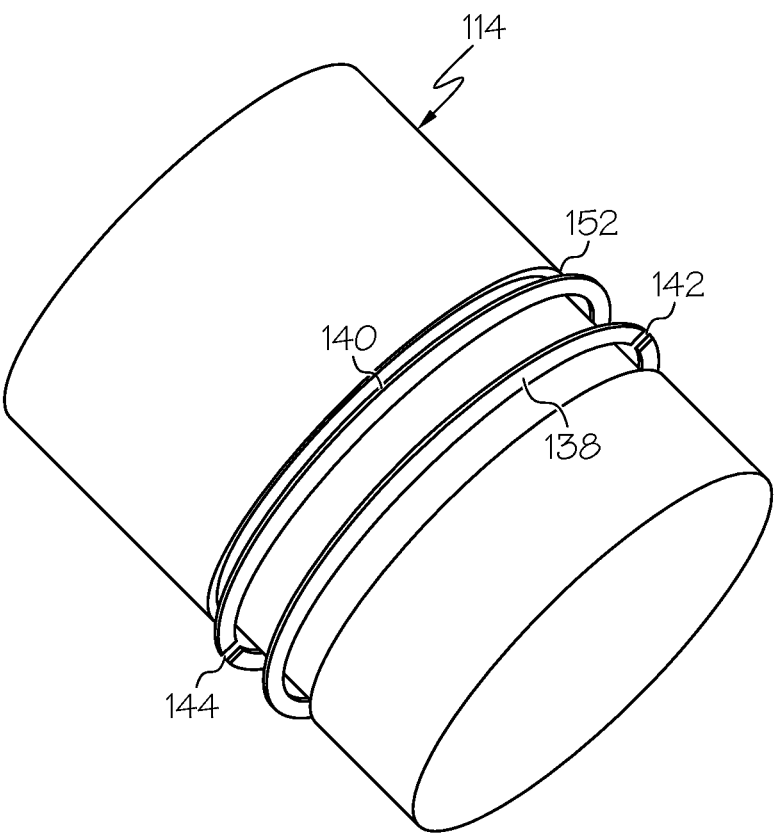
FIG. 10 is a schematic, perspective view of a piston and a seal of the apparatus of FIG. 1, according to one or more examples of the subject matter, disclosed herein.

Referring generally to FIG. 1 and particularly to, e.g., FIG. 10 for illustrative purposes only and not by way of limitation, piston 114 comprises annular groove 152, perpendicular to symmetry axis 106. First piston ring 138 and second piston ring 140 are situated within annular groove 152. The preceding portion of this paragraph characterizes example eight of the subject matter, disclosed herein, where example eight also encompasses example seven, above.

Situating first piston ring 138 and second piston ring 140 within annular groove 152 of piston 114 secures first piston ring 138 and second piston ring 140 to piston 114 in a side-by-side relationship and in close proximity to each other. Annular groove 152 also enables first piston ring 138 and second piston ring 140 to float freely within annular groove 152.

In one or more examples, in response to application of the vacuum within the closed chamber, first piston ring 138 presses forcibly against piston 114, via negative pressure within the closed chamber, to create a gas-tight seal at an interface between first piston ring 138 and piston 114. In response to application of the vacuum within the closed chamber, second piston ring 140 presses forcibly against first piston ring 138, via negative pressure within the closed chamber, to create a gas-tight seal at an interface between second piston ring 140 and first piston ring 138.

Referring generally to FIG. 1 and particularly to, e.g., FIG. 10 for illustrative purposes only and not by way of limitation, first piston ring 138 comprises first ring gap 142 and second piston ring 140 comprises second ring gap 144. First ring gap 142 and second ring gap 144 are angularly separated from each other about symmetry axis 106. The preceding portion of this paragraph characterizes example nine of the subject matter, disclosed herein, where example nine also encompasses example eight, above.

First ring gap 142 and second ring gap 144 being angularly separated from each other minimizes leakage of vacuum past first piston ring 138 or second piston ring 140 and maintains the hermetic seal of the closed chamber at the interface between piston 114 and barrel 104.

In one or more examples, in response to application of vacuum within the closed chamber, gas that passes through first ring gap 142 of first piston ring 138 encounters second piston ring 140. In response to application of vacuum via first ring gap 142, second piston ring 140 presses forcibly against first piston ring 138 to create a gas-tight seal at an interface between second piston ring 140 and first piston ring 138.

First ring gap 142 and second ring gap 144 are angularly separated from each other about symmetry axis 106 at any suitable angle. In one or more examples, as illustrated in FIG. 10, first ring gap 142 and second ring gap 144 are angularly separated from each at an angle of approximately 180 degrees. However, other angles of angular separation are also contemplated.

Figure 7:
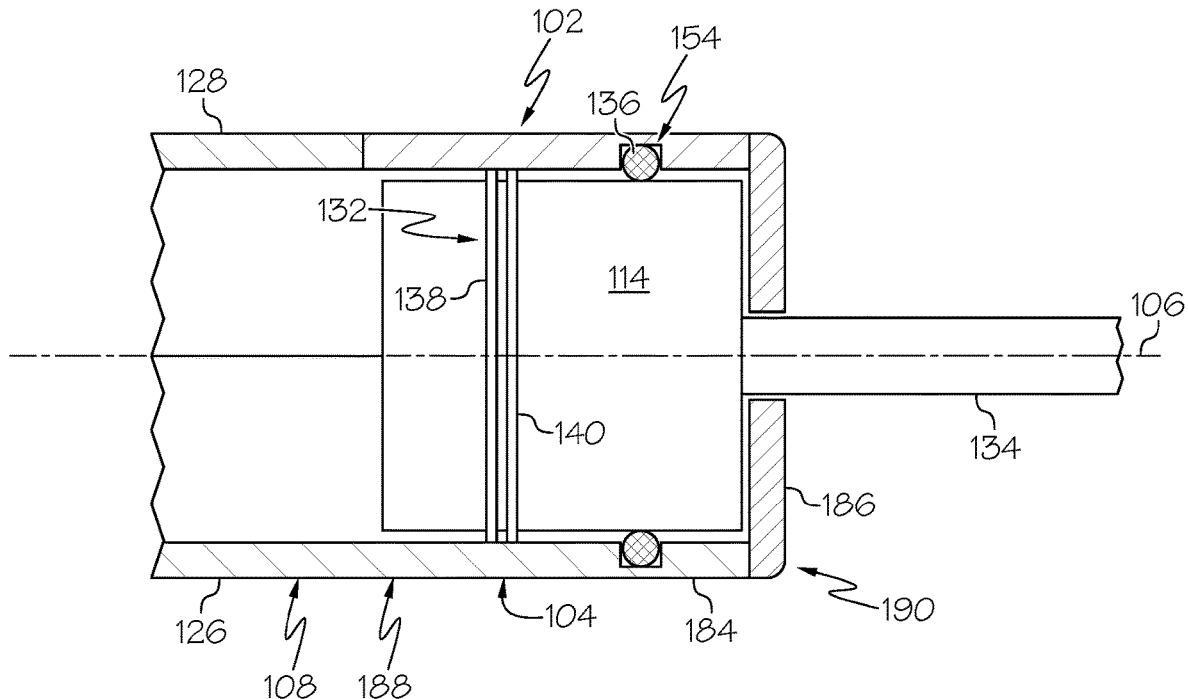
FIG. 7 is a schematic, elevation, sectional view of a portion of the apparatus of FIG. 1, according to one or more examples of the subject matter, disclosed herein.
Figure 8:
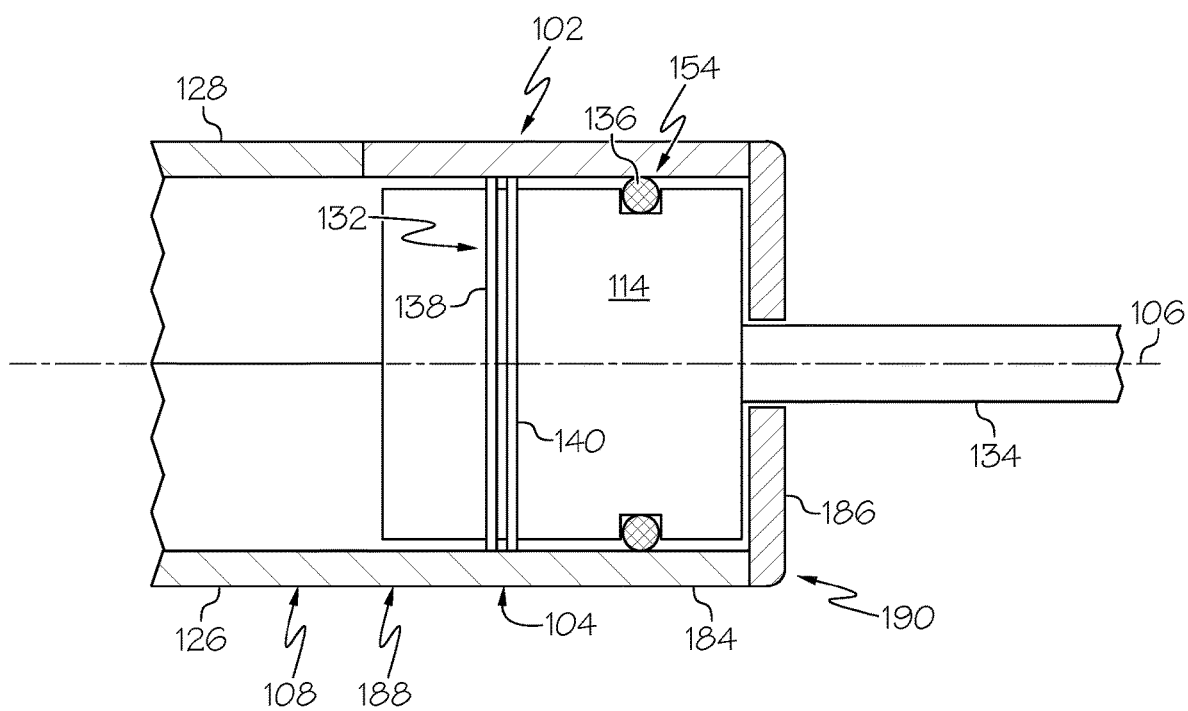
FIG. 8 is a schematic, elevation, sectional view of a portion of the apparatus of FIG. 1, according to one or more examples of the subject matter, disclosed herein.

Referring generally to FIG. 1 and particularly to, e.g., FIGS. 7 and 8 for illustrative purposes only and not by way of limitation, apparatus 100 further comprises second seal 154, which is in contact with piston 114 and barrel 104. The preceding portion of this paragraph characterizes example ten of the subject matter, disclosed herein, where example ten also encompasses any one of examples one to nine, above.

Second seal 154 creates a second gas-tight seal at a second interface between piston 114 and barrel 104. In combination, seal 132 and second seal 154 provide a two-stage sealing mechanism for preventing pressure leakage and maintaining vacuum within closed chamber.

In one or more examples, second seal 154 is spaced away from seal 132 along symmetry axis 106. For example, second seal 154 is located downstream of application of the vacuum to the closed chamber. With piston 114 in the retracted position and in the extended position, second seal 154 creates a gas-tight seal at the second interface between piston 114 and barrel 104. Second seal 154 remains within barrel 104 throughout the stroke of piston 114 and maintains the gas-tight seal at the second interface between piston 114 and barrel 104 during movement of piston 114 along symmetry axis 106.

Second seal 154 is located between inner circumference of barrel 104 and the circumference of piston 114 such that second seal 154 is in contact with barrel 104 and piston 114. Second seal 154 is in direct contact with barrel 104 and piston 114 such that a hermetic seal is formed between barrel 104 and piston 114.

Second seal 154 has any one of various cross-sectional geometries, such as circular, square, and the like. Second seal 154 is made of any suitable material that is heat-resistance and capable of maintaining the hermetic seal in response to high pressure. In one or more examples, second seal 154 is made of a synthetic rubber, such as a fluoropolymer elastomer, e.g. Viton™.

Referring generally to FIG. 1 and particularly to, e.g., FIG. 7 for illustrative purposes only and not by way of limitation, second seal 154 is O-ring 136, fixed relative to barrel 104 along symmetry axis 106. The preceding portion of this paragraph characterizes example eleven of the subject matter, disclosed herein, where example eleven also encompasses example ten, above.

O-ring 136 is compressed between piston 114 and barrel 104 to create the gas-tight seal at the second interface between piston 114 and barrel 104. Fixing O-ring 136 relative to barrel 104 along symmetry axis 106 enables piston 114 to move relative to O-ring 136.

In one or more examples, as illustrated in FIG. 7, O-ring 136 is located on and extends around the inner circumference of barrel 104 such that O-ring 136 is in contact with barrel 104 and piston 114. O-ring 136 is in direct contact with barrel 104 and piston 114 such that a hermetic seal is formed between barrel 104 and piston 114. In one or more examples, barrel 104 include an annular groove formed in the inner wall, or inner surface, of barrel 104, perpendicular to symmetry axis 106. O-ring 136 is situated within the annular groove formed in barrel 104.

Coupling O-ring 136 to barrel 104 promotes manufacturability of apparatus 100. In one or more examples, barrel 104 includes barrel-cylinder 184 and barrel-end wall 186. Barrel-cylinder 184 includes barrel-first end 188 and barrel-second end 190 that is opposite to barrel-first end 188. Barrel-first end 188 is open. With housing 102 in the closed state, barrel-first end 188 is in volumetric communication with receptacle 108. In one or more examples, barrel-end wall 186 is coupled to barrel-cylinder 184 such that barrel-second end 190 is closed. In an example, O-ring 136 being coupled to barrel 104 and fixed relative to barrel 104 along symmetry axis 106 enables piston 114 to be properly situated within (e.g., inserted into) barrel 104 through barrel-first end 188 such that there is no interference between seal 132 and second seal 154 during insertion of piston 114.

Referring generally to FIG. 1 and particularly to, e.g., FIG. 7 for illustrative purposes only and not by way of limitation, second seal 154 is O-ring 136, fixed relative to piston 114 along symmetry axis 106. The preceding portion of this paragraph characterizes example twelve of the subject matter, disclosed herein, where example twelve also encompasses example ten, above.

O-ring 136 is compressed between piston 114 and barrel 104 to create the gas-tight seal at the second interface between piston 114 and barrel 104. Fixing O-ring 136 relative to piston 114 along symmetry axis 106 enables O-ring 136 to move with piston 114 relative to barrel 104.

In one or more examples, as illustrated in FIG. 8, O-ring 136 is located on and extends around the circumference of piston 114 such that O-ring 136 is in contact with piston 114 and barrel 104. O-ring 136 is in direct contact with piston 114 and barrel 104 such that a hermetic seal is formed between piston 114 and barrel 104. In one or more examples, piston 114 includes a second annular groove, formed in an exterior surface of piston 114, perpendicular to symmetry axis 106. O-ring 136 is situated within the second annular groove formed in piston 114.

Coupling O-ring 136 to piston 114 promotes manufacturability of apparatus 100. In one or more examples, barrel-end wall 186 is removably coupled to barrel-cylinder 184 such that barrel-second end 190 is open when barrel-end wall 186 is removed and is closed when barrel-end wall 186 is attached. With barrel-end wall 186 removed from barrel-cylinder 184, piston 114 can be inserted into barrel 104 through barrel-second end 190. In an example, O-ring 136 being coupled to piston 114 and fixed relative to piston 114 along symmetry axis 106 enables piston 114 to be properly situated within (e.g., inserted into) barrel 104 though a barrel-second end 190 when barrel-end wall 186 is removed.

Figure 9:
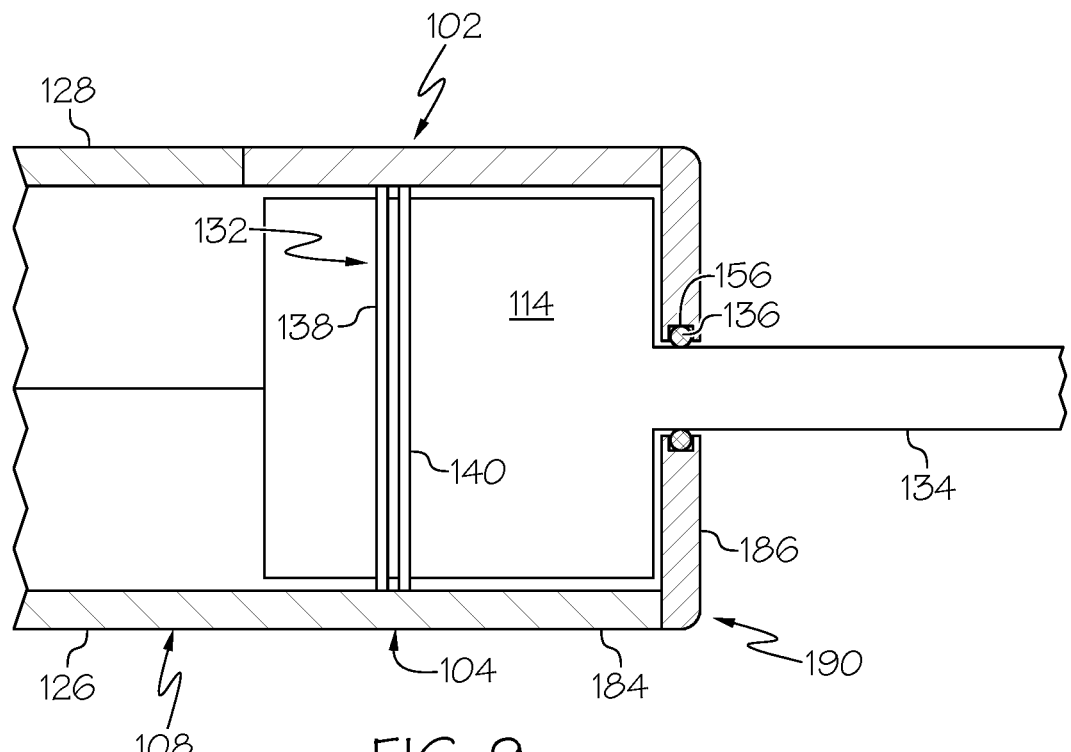
FIG. 9 is a schematic, elevation, sectional view of a portion of the apparatus of FIG. 1, according to one or more examples of the subject matter, disclosed herein.

Referring generally to FIG. 1 and particularly to, e.g., FIG. 9 for illustrative purposes only and not by way of limitation, apparatus 100 further comprises piston rod 134, coupled to piston 114 and extending through barrel 104, and piston-rod seal 156, which is in contact with piston rod 134 and barrel 104. The preceding portion of this paragraph characterizes example thirteen of the subject matter, disclosed herein, where example thirteen also encompasses any one of examples one to nine, above.

Piston rod 134 transfers force from drive system 148 to piston 114. Piston-rod seal 156 creates a gas-tight seal at an interface between piston rod 134 and barrel 104. In combination, seal 132 and piston-rod seal 156 provide a two-stage sealing mechanism for preventing pressure leakage and maintaining vacuum within closed chamber.

In one or more examples, barrel-end wall 186 of barrel 104 includes a piston-rod aperture. Piston rod 134 extends through the piston-rod aperture formed in barrel-end wall 186 and is coupled to drive system 148. In one or more examples, piston rod 134 is an example of the power-transmission component of drive system 148. In one or more examples, piston rod 134 is made of a metallic material, such as A2 Tool Steel.

With piston 114 in the retracted position and in the extended position, piston-rod seal 156 creates the gas-tight seal at the interface between piston rod 134 and barrel 104. Piston-rod seal 156 remains within barrel 104 throughout the stroke of piston 114 and maintains the gas-tight seal at the interface between piston rod 134 and barrel 104 during movement of piston 114 along symmetry axis 106.

Piston-rod seal 156 is located between a circumference of the piston-rod aperture formed in barrel-end wall 186 and a circumference of piston rod 134 such that piston-rod seal 156 is in contact with barrel-end wall 186 and piston rod 134. Piston-rod seal 156 is in direct contact with barrel-end wall 186 and piston rod 134 such that a hermetic seal is formed between barrel-end wall 186 and piston rod 134.

Piston-rod seal 156 has any one of various cross-sectional geometries, such as circular, square, and the like. Piston-rod seal 156 is made of any suitable material that is heat-resistance and capable of maintaining the hermetic seal in response to high pressure. In one or more examples, piston-rod seal 156 is made of a synthetic rubber, such as a fluoropolymer elastomer, e.g. Viton™.

Referring generally to FIG. 1 and particularly to, e.g., FIG. 9 for illustrative purposes only and not by way of limitation, piston-rod seal 156 is O-ring 136, fixed relative to barrel 104 along symmetry axis 106. The preceding portion of this paragraph characterizes example fourteen of the subject matter, disclosed herein, where example fourteen also encompasses example thirteen, above.

O-ring 136 is compressed between piston rod 134 and barrel-end wall 186 to create the gas-tight seal at the interface between piston rod 134 and barrel-end wall 186. Fixing O-ring 136 relative to barrel 104 along symmetry axis 106 enables piston rod 134 to move relative to O-ring 136.

In one or more examples, as illustrated in FIG. 8, O-ring 136 is located on and extends around the circumference of the piston-rod aperture formed in barrel-end wall 186 such that O-ring 136 is in contact with barrel-end wall 186 and piston rod 134. O-ring 136 is in direct contact with barrel-end wall 186 and piston rod 134 such that a hermetic seal is formed between barrel-end wall 186 and piston rod 134. In one or more examples, barrel-end wall 186 include an annular groove formed around the circumference of the piston-rod aperture, perpendicular to symmetry axis 106. O-ring 136 is situated within the annular groove formed in barrel-end wall 186.

Referring generally to FIG. 1 and particularly to, e.g., FIGS. 2-6 and 10-13 for illustrative purposes only and not by way of limitation, base 126 comprises tapered base-end 122, opposite barrel 104 along symmetry axis 106, and lid 128 comprises tapered lid-end 124, opposite barrel 104 along symmetry axis 106. With housing 102 in the closed state, tapered base-end 122 and tapered lid-end 124 collectively form tapered receptacle-end 118 of receptacle 108. The preceding portion of this paragraph characterizes example fifteen of the subject matter, disclosed herein, where example fifteen also encompasses any one of examples one to fourteen, above.

With housing 102 in the closed state, tapered receptacle-end 118 reduces a cross-sectional dimension of receptacle 108 such that tapered receptacle-end 118 forms stop 192 (FIG. 5) against which ingot 110 is abutted when the force is applied to ingot 110 by piston 114. With housing 102 in the closed state, tapered receptacle-end 118 of receptacle 108 also provides headspace 196 (FIG. 5) formed between ingot 110 and the de-gassing port 120.

In one or more examples, consolidation of ingot 110 does not begin to occur until ingot 110 is in contact with stop 192 formed by tapered receptacle-end 118. In other words, during consolidation, ingot 110 is compressed between piston 114 and stop 192. Headspace 196 is a portion of an interior volume of the closed chamber that remains open (e.g., is not filled by ingot 110) during de-gassing and consolidation. Headspace 196 provides a volume for application of the vacuum to the closed chamber and, thus, to ingot 110 while ingot 110 is being compressed by piston 114.

In one or more examples, during consolidation, a portion of ingot 110 may be compressed into tapered receptacle-end 118 of receptacle 108 such that an amount of fiber-reinforce material may contact, or enter, de-gassing port 120. In such situations, de-gassing port 120 is cleaned following consolidation to remove any fiber-reinforced material. In one or more examples, housing 102 includes an anti-clogging mechanism that is configured to prevent fiber-reinforced material from entering de-gassing port 120 during consolidation.

Tapered base-end 122 and tapered lid-end 124 have any one of various structural configurations to form tapered receptacle-end 118. In one or more examples, tapered receptacle-end 118 is frustoconical, curved, conical, circular, or the like. In one or more examples, a taper angle of tapered base-end 122 and tapered lid-end 124 is no more than approximately 45 degrees relative to symmetry axis 106. In one of more examples, the taper angle of tapered base-end 122 and tapered lid-end 124 is less than 90 degrees relative to symmetry axis 106.

Referring generally to FIG. 1 and particularly to, e.g., FIGS. 2-6 and 10-13 for illustrative purposes only and not by way of limitation, de-gassing port 120 is located on one of tapered base-end 122 or tapered lid-end 124. The preceding portion of this paragraph characterizes example sixteen of the subject matter, disclosed herein, where example sixteen also encompasses example fifteen, above.

Situating de-gassing port 120 on one of tapered base-end 122 or tapered lid-end 124 enables application of the vacuum within the closed chamber when ingot 110 is compressed by piston 114 against stop 192.

In one or more examples, as ingot 110 is compressed by piston 114 against stop 192 during consolidation, the diameter of ingot 110 increases until a circumferential surface of ingot 110 encounters the inner surface of receptacle 108, and the interior volume of the closed chamber is filled by ingot 110 and piston 114. At this point, headspace 196 provides a portion of the internal volume of the closed chamber that remains open and that is not filled by ingot 110. Situating de-gassing port 120 on one of tapered base-end 122 or tapered lid-end 124 enables application of the vacuum within headspace 196 and, thus, to at least a portion of ingot 110 during consolidation.

Referring generally to FIG. 1 and particularly to, e.g., FIGS. 2-6 and 14 for illustrative purposes only and not by way of limitation, with housing 102 in the closed state, tapered receptacle-end 118 comprises tip 162, though which symmetry axis 106 passes. When de-gassing port 120 is located on tapered lid-end 124, de-gassing port 120 is situated closer, along symmetry axis 106, to tip 162 of tapered receptacle-end 118 than to a portion of lid 128, extending away from tapered lid-end 124 along symmetry axis 106. When de-gassing port 120 is located on tapered base-end 122, de-gassing port 120 is situated closer, along symmetry axis 106, to tip 162 of tapered receptacle-end 118 than to a portion of base 126, extending away from tapered base-end 122 along symmetry axis 106. The preceding portion of this paragraph characterizes example seventeen of the subject matter, disclosed herein, where example seventeen also encompasses example fifteen or sixteen, above.

Situation of de-gassing port 120 close to tip 162 of tapered receptacle-end 118 reduces the likelihood that de-gassing port 120 will be plugged by ingot 110 during consolidation. Situating de-gassing port 120 close to tip 162 of tapered receptacle-end 118 also increases the portion of the internal volume of the closed chamber that remains open and that is available for vacuum de-gassing and pressure consolidation.

Figure 11:
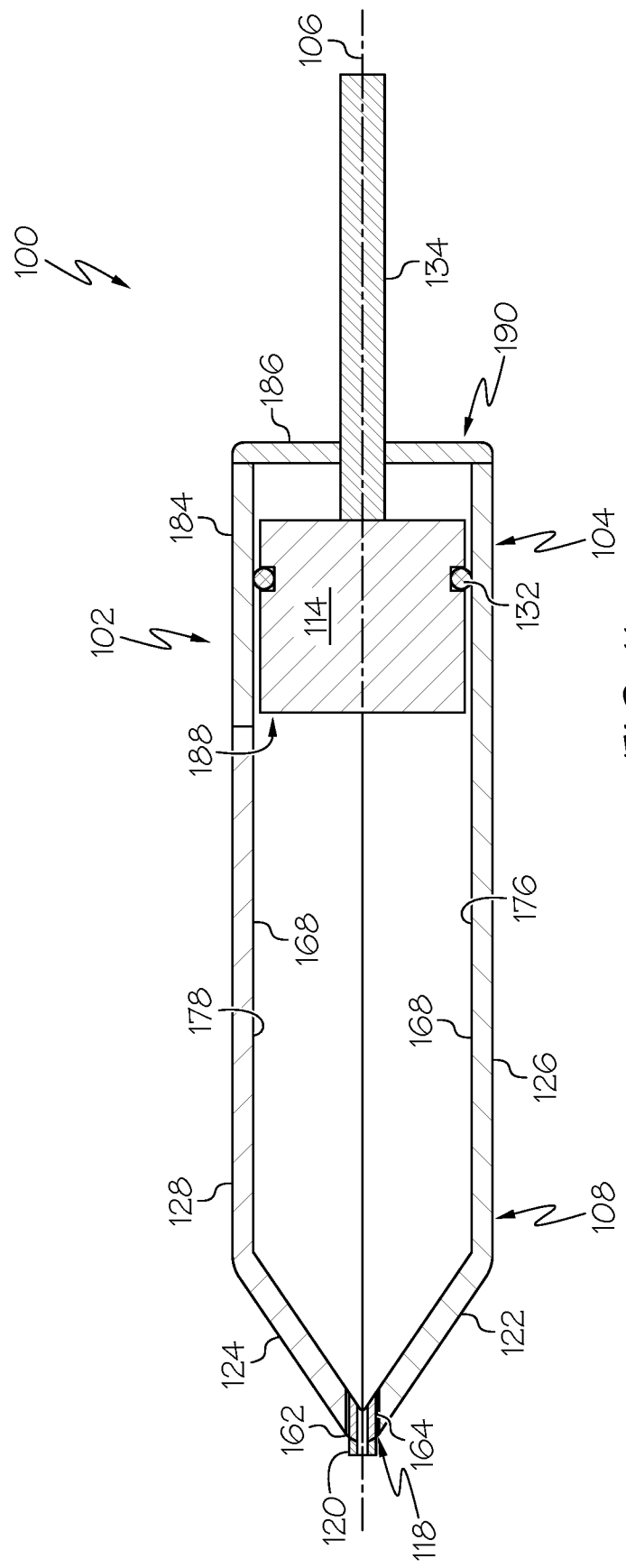
FIG. 11 is a schematic, elevation, sectional view of the apparatus of FIG. 1, according to one or more examples of the subject matter, disclosed herein.
Figure 12:
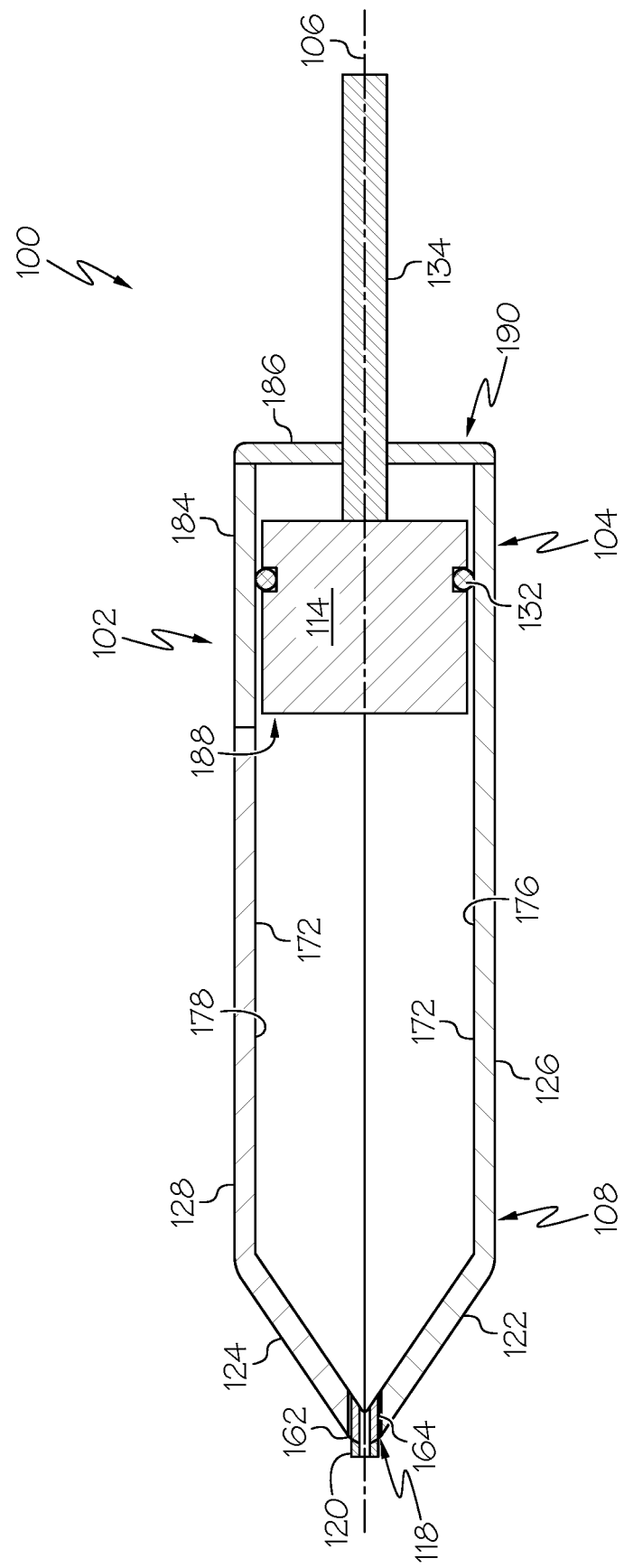
FIG. 12 is a schematic, elevation, sectional view of apparatus of FIG. 1, according to one or more examples of the subject matter, disclosed herein.

Referring generally to FIG. 1 and particularly to, e.g., FIGS. 11-13 for illustrative purposes only and not by way of limitation, with housing 102 in the closed state, de-gassing port 120 is situated at tip 162 of tapered receptacle-end 118. The preceding portion of this paragraph characterizes example eighteen of the subject matter, disclosed herein, where example eighteen also encompasses example seventeen, above.

Situation of de-gassing port 120 close to tip 162 of tapered receptacle-end 118 further reduces the likelihood that de-gassing port 120 will be plugged by ingot 110 during consolidation. Situating de-gassing port 120 close to tip 162 of tapered receptacle-end 118 maximizes the portion of the internal volume of the closed chamber that remains open and that is available for vacuum de-gassing and pressure consolidation.

In one or more examples, situating de-gassing port 120 at tip 162 of tapered receptacle-end 118 also enables removal of de-gassing port 120 from receptacle 108. In one or more examples, with housing 102 in the closed state, de-gassing port 120 is located between tapered base-end 122 and tapered lid-end 124 at tip 162 of tapered receptacle-end 118. With housing 102 in the open state, de-gassing port 120 is removable from housing 102.

Referring generally to FIG. 1 and particularly to, e.g., FIG. 13 for illustrative purposes only and not by way of limitation, apparatus 100 further comprises second gasket 164 that is in contact with de-gassing port 120 and with at least one of lid 128 of receptacle 108 or base 126 of receptacle 108 when housing 102 is in the closed state. The preceding portion of this paragraph characterizes example nineteen of the subject matter, disclosed herein, where example nineteen also encompasses example eighteen, above.

With housing 102 in the closed state, second gasket 164 creates a gas-tight seal at an interface between tapered base-end 122 and de-gassing port 120 and at an interface between tapered lid-end 124 and de-gassing port 120.

In one or more examples, with housing 102 in the closed state, a portion of second gasket 164 is in direct contact with tapered base-end 122 and with de-gassing port 120 such that a hermetic seal is formed between tapered base-end 122 and de-gassing port 120 and a portion of second gasket 164 is in direct contact with tapered lid-end 124 and with de-gassing port 120 such that a hermetic seal is formed between tapered lid-end 124 and de-gassing port 120.

Second gasket 164 has any one of various cross-sectional geometries, such as circular, square, and the like. Second gasket 164 is made of any suitable material that is heat-resistance and capable of maintaining the hermetic seal in response to high pressure. In one or more examples, gasket 130 is made of a synthetic rubber, such as a fluoropolymer elastomer, e.g. Viton™.

Referring generally to FIG. 1 and particularly to, e.g., FIGS. 2-4 for illustrative purposes only and not by way of limitation, with housing 102 in the closed state, lid 128 of receptacle 108 and base 126 of receptacle 108 are configured to be releasably fastened to each other. The preceding portion of this paragraph characterizes example twenty of the subject matter, disclosed herein, where example twenty also encompasses any one of examples one to nineteen, above.

Releasably fastening lid 128 and base 126 together enables housing 102 to be opened and closed and to be locked in the closed state to react to internal pressurization of the closed chamber.

In one or more examples, housing 102 includes fastener 166. Fastener 166 is configured to releasably fasten lid 128 and base 126 together when housing 102 is in the closed state. Fastener 166 includes any one of various types of fastening mechanisms. In one or more examples, fastener 166 includes at least one of a clamp, a latch, a screw, a bolt, another type of mechanical fastener, or a combination thereof. In one or more examples, fastener 166 is configured to engage a portion of base 126 and a portion of lid 128, such as along the interface between base 126 and lid 128, opposite hinge 198. In one or more examples, fastener 166 is configured to surround a circumference of receptacle 108.

Referring generally to FIG. 1 and particularly to, e.g., FIG. 14 for illustrative purposes only and not by way of limitation, base 126 of receptacle 108 comprises inner base-surface 176 and pull-tab 170, coupled to inner base-surface 176. The preceding portion of this paragraph characterizes example twenty-one of the subject matter, disclosed herein, where example twenty-one also encompasses any one of examples one to twenty, above.

Pull-tab 170 facilitates removal of ingot 110 following de-gassing and consolidation. In one or more examples, pull-tab 170 is made of a material, suitable for contacting composite materials, such as the fiber-reinforced resin material. In one or more examples, a portion of pull-tab 170 is located along inner base-surface 176 of base 126 such that the portion of pull-tab 170 is between ingot 110 and inner base-surface 176 when ingot 110 is positioned in base 126. Another portion of pull-tab 170 extends beyond the perimeter of base 126 such that it is accessible when ingot 110 is positioned in base 126.

Referring generally to FIG. 1 and particularly to, e.g., FIG. 11 for illustrative purposes only and not by way of limitation, base 126 of receptacle 108 comprises inner base-surface 176 and lid 128 of receptacle 108 comprises inner lid-surface 178. Receptacle 108 comprises release coating 168, applied to at least one of inner base-surface 176 or inner lid-surface 178. The preceding portion of this paragraph characterizes example twenty-two of the subject matter, disclosed herein, where example twenty-two also encompasses any one of examples one to twenty-one, above.

Release coating 168 facilitates removal of ingot 110 following de-gassing and consolidation. Release coating 168 reduces the tendency of ingot 110 to stick to contact surfaces of base 126 and lid 128 following de-gassing and consolidation. In one or more examples, release coating 168 is made of a material, suitable for contacting composite materials, such as the fiber-reinforced resin material. In one or more examples, release coating 168 is a plasma spray ceramic coating.

Referring generally to FIG. 1 and particularly to, e.g., FIG. 12 for illustrative purposes only and not by way of limitation, base 126 of receptacle 108 comprises inner base-surface 176 and lid 128 of receptacle 108 comprises inner lid-surface 178. Receptacle 108 comprises release sheet 172, coupled to at least one of inner base-surface 176 and inner lid-surface 178. The preceding portion of this paragraph characterizes example twenty-three of the subject matter, disclosed herein, where example twenty-three also encompasses any one of examples one to twenty-one, above.

Release sheet 172 facilitates removal of ingot 110 following de-gassing and consolidation. Release sheet 172 reduces the tendency of ingot 110 to stick to the inner surfaces of base 126 and lid 128 following consolidation. In one or more examples, release sheet 172 is made of a material, suitable for contacting composite materials, such as the fiber-reinforced resin material. In one or more examples, release sheet 172 is made of fluorinated ethylene propylene.

Referring generally to FIG. 15 and particularly to, e.g., FIGS. 1A, 1B and 2-14 for illustrative purposes only and not by way of limitation, method 1000 of consolidating ingot 110 of fiber-reinforced material is disclosed. Method 1000 comprises (block 1002) heating ingot 110 to a predetermined temperature above room temperature. Method 1000 also comprises (block 1004) forming a hermetically sealed chamber around ingot 110. Method 1000 further comprises (block 1006) applying a vacuum to ingot 110 in the hermetically sealed chamber and (block 1008) applying a force to ingot 110 in the hermetically sealed chamber while applying the vacuum to ingot 110. The preceding portion of this paragraph characterizes example twenty-four of the subject matter, disclosed herein.

Method 1000 facilitates de-gassing and consolidating ingot 110 of the fiber-reinforced resin material. De-gassing and consolidation of ingot 110 reduces or eliminates air pockets disposed within ingot 110 and minimizes porosity of the fiber-reinforced resin material for a follow-on application.

As expressed above, prior to extrusion, air pockets are often trapped within ingot 110. If this trapped air is not removed from ingot 110 prior to extrusion, the extruded fiber-reinforced resin material has an undesirably high level of porosity for some applications. Examples of method 1000, disclosed herein, such as examples of method 1000 utilizing apparatus 100, promote effective de-gassing and consolidation of ingot 110 prior to being loaded into the extrusion machine, which eliminates or greatly reduces the air pockets and porosity of ingot 110 prior to extrusion. Accordingly, the porosity of the extruded fiber-reinforced resin material is eliminated or greatly reduced.

Heating ingot 110 to predetermined temperature above room temperature softens and otherwise prepares ingot 110 for vacuum de-gassing and consolidation. Forming the hermetically sealed chamber around ingot 110 provides a suitable processing environment for vacuum de-gassing. Applying the vacuum to ingot 110 in the hermetically sealed chamber lowers the pressure inside the hermetically sealed chamber, exposes the surface of ingot 110 to vacuum, and removes gas, such as air, from a boundary layer of ingot 110. Applying the force to ingot 110 in the hermetically sealed chamber, while applying the vacuum to ingot 110, compacts ingot 110 and urges gas trapped within ingot 110 toward the boundary layer for vacuum de-gassing.

Referring generally to FIG. 15 and particularly to, e.g., FIG. 1 for illustrative purposes only and not by way of limitation, according to method 10000, (block 1002) heating ingot 110 to the predetermined temperature precedes (block 1004) forming the hermetically sealed chamber around ingot 110. The preceding portion of this paragraph characterizes example twenty-five of the subject matter, disclosed herein, where example 25 also encompasses example twenty-four, above.

Heating ingot 110 to the predetermined temperature above room temperature before forming the hermetically sealed chamber around ingot 110 reduces cycle time by preheating ingot 110 to the predetermined temperature such that ingot 110 is ready for vacuum de-gassing and consolidation. In one or more examples, ingot 110 is heated to the predetermined temperature outside of the hermetically sealed chamber and is positioned within the hermetically sealed chamber once heating is completed. In one or more examples, a plurality of ingots is heated to the predetermined temperature such that each one of the plurality of ingots is ready for vacuum de-gassing and consolidation.

Referring generally to FIG. 15 and particularly to, e.g., FIG. 1 for illustrative purposes only and not by way of limitation, according to method 1000, (block 1002) heating ingot 110 to the predetermined temperature follows (block 1004) forming the hermetically sealed chamber around ingot 110. The preceding portion of this paragraph characterizes example twenty-six of the subject matter, disclosed herein, where example twenty-six also encompasses example twenty-four, above.

Heating ingot 110 to the predetermined temperature after forming the hermetically sealed chamber around ingot 110 enables partial heating of ingot 110 in response to application of the force. Application of the force to ingot 110 compresses ingot 110, which results in internal heating of ingot 110 due to compression. As such, the temperature of ingot 110 increases in response to the force applied to ingot 110. The increase in temperature of ingot 110 due to compression results in a reduced heating time for ingot 110 within the hermetically sealed chamber.

Referring generally to FIG. 15 and particularly to, e.g., FIG. 1 for illustrative purposes only and not by way of limitation, according to method 1000, (block 1006) applying the vacuum to ingot 110 precedes (block 1008) applying the force to ingot 110. The preceding portion of this paragraph characterizes example twenty-seven of the subject matter, disclosed herein, where example twenty-seven also encompasses any one of examples twenty-four to twenty-six, above.

Applying the vacuum to ingot 110 before applying the force to ingot 110 enables the vacuum to act on a greater portion of the surface of ingot 110 while ingot 110 is being compressed. Application of the force to ingot 110 displaces a volume of ingot 110 within the hermetically sealed chamber so that a final, compressed, volume of ingot 110 is less than a starting, uncompressed, volume of ingot 110. In one or more examples, at some point during consolidation of ingot 110 in response to the force applied to ingot 110, a circumferential portion of the surface of ingot 110 will be in contact with an inner surface of receptacle 108. At this point, the vacuum is applied only to an end portion of the surface of ingot 110. Applying the vacuum to ingot 110 before applying the force to ingot 110 enables the vacuum to act on the circumferential portion of the surface of ingot 110 before ingot 110 is compressed and while ingot 110 is being compressed until the circumferential portion of the surface of ingot 110 contacts the inner surface of receptacle 108.

Referring generally to FIG. 15 and particularly to, e.g., FIG. 1 for illustrative purposes only and not by way of limitation, method 1000 further comprises (block 1010) maintaining ingot 110 at the predetermined temperature for a first predetermined time period while applying the vacuum to ingot 110. The preceding portion of this paragraph characterizes example twenty-eight of the subject matter, disclosed herein, where example twenty-eight also encompasses example twenty-seven, above.

Maintaining ingot 110 at the predetermined temperature for the first predetermined time period while applying the vacuum to ingot 110 enables the de-gassing process of ingot 110 to be based on a set of process parameters. In one or more examples, the de-gassing process is empirically determined such that material de-gassing is deemed complete upon completion of the set of parameters, including time, temperature, and the vacuum, applied to ingot 110. For example, when ingot 110 is maintained at the predetermined temperature, and the vacuum is applied to ingot 110 for the first predetermined time period, the vacuum de-gassing process is deemed complete. As such, the first predetermined time period is determined by the time required to adequately de-gas the boundary layer of ingot 110 at a given vacuum pressure and temperate. In one or more examples, the first predetermined time period, in which ingot 110 is maintained at the predetermined temperature, and the vacuum is applied to ingot 110, is in the range of approximately two to three hours. In one or more examples, the set of process parameters is empirically determined and documented, such as in a look-up table. Such time-based, empirical processing also eliminates a sensing step or a requirement for material testing to determine if ingot 110 is sufficiently de-gassed.

Referring generally to FIG. 15 and particularly to, e.g., FIG. 1 for illustrative purposes only and not by way of limitation, method 1000 further comprises (block 1012) maintaining ingot 110 at the predetermined temperature for a second predetermined time period while applying the vacuum to ingot 110 and applying the force to ingot 110. The preceding portion of this paragraph characterizes example twenty-nine of the subject matter, disclosed herein, where example twenty-nine also encompasses example twenty-eight, above.

Maintaining ingot 110 at the predetermined temperature for the second predetermined time period, while applying the vacuum to ingot 110 and applying the force to ingot 110, enables the de-gassing and consolidation process of ingot 110 to be based on a set of process parameters. In one or more examples, the de-gassing and consolidation process is empirically determined such that material de-gassing and consolidation is deemed complete upon completion of the set of parameters, including time, temperature, the vacuum applied to ingot 110, and the force applied to ingot 110. For example, when ingot 110 is maintained at the predetermined temperature, the vacuum is applied to ingot 110, and the force is applied to ingot 110 for the second predetermined time period, the vacuum de-gassing and consolidation process is deemed complete. As such, the second predetermined time period is determined by the time, required to adequately consolidate ingot 110 and de-gas the boundary layer of ingot 110 at a given vacuum pressure, applied force, and temperate. In one or more examples, the second predetermined time period, in which ingot 110 is maintained at the predetermined temperature, and the vacuum is applied to ingot 110, is approximately one hour. In one or more examples, the set of process parameters is empirically determined and documented, such as in a look-up table. Such time-based, empirical processing also eliminates a sensing step or a requirement for material testing to determine if ingot 110 is sufficiently consolidated and de-gassed.

Referring generally to FIG. 15 and particularly to, e.g., FIG. 1 for illustrative purposes only and not by way of limitation, according to method 1000, the predetermined temperature is from 120 degrees to 150 degrees Fahrenheit. The preceding portion of this paragraph characterizes example thirty of the subject matter, disclosed herein, where example thirty also encompasses any one of examples twenty-four to twenty-nine, above.

The predetermined temperature of between 120 degrees and 150 degrees Fahrenheit adequately softens ingot 110 for de-gassing via application of the vacuum and consolidation via application of the force without damaging ingot 110.

Referring generally to FIG. 15 and particularly to, e.g., FIG. 1 for illustrative purposes only and not by way of limitation, according to method 1000, the force, applied to ingot 110, results in a pressure, ranging from 600 psi to 1,000 psi, applied to ingot 110. The preceding portion of this paragraph characterizes example thirty-one of the subject matter, disclosed herein, where example thirty-one also encompasses any one of examples 24 to thirty, above.

Application of the force that results in a compression pressure in the range of 600 psi to 1,000 psi, applied to the ingot 110, adequately consolidates ingot 110 to urge air trapped within ingot 110 toward the boundary layer of ingot 110 for vacuum de-gassing without damaging ingot 110.

Referring generally to FIG. 15 and particularly to, e.g., FIG. 1 for illustrative purposes only and not by way of limitation, according to method 1000, the vacuum, applied to ingot 110, is between −28 in-Hg and −30 in-Hg. The preceding portion of this paragraph characterizes example thirty-two of the subject matter, disclosed herein, where example thirty-two also encompasses any one of examples twenty-four to thirty-one, above.

Application of the vacuum between −28 in.-Hg and −30 in.-Hg, applied to ingot 110, adequately de-gases the boundary layer of ingot 110 without damaging ingot 110 and evacuates air and other gases from within the hermetically sealed chamber.

Referring generally to FIG. 15 and particularly to, e.g., FIGS. 1 and 2-14 for illustrative purposes only and not by way of limitation, method 1000 further comprises (block 1014) accessing apparatus 100 for consolidating ingot 110. According to method 1000, apparatus 100 comprises housing 102, comprising barrel 104, having symmetry axis 106. Housing 102 also comprises receptacle 108. Receptacle 108 comprises base 126, extending from barrel 104 along symmetry axis 106, and lid 128, selectively positionable relative to base 126 of receptacle 108 and relative to barrel 104 of housing 102 such that housing 102 is in an open state or in a closed state. Receptacle 108 also comprises de-gassing port 120, configured to be selectively open or selectively closed. Apparatus 100 also comprises gasket 130 that is in contact with lid 128 of receptacle 108, base 126 of receptacle 108, and barrel 104 when housing 102 is in the closed state. Apparatus 100 further comprises piston 114, movable along symmetry axis 106 between, inclusively, a retracted position, in which piston 114, in its entirety, is in barrel 104, and an extended position, in which a portion of piston 114 is in receptacle 108 and another portion of piston 114 is in barrel 104. Apparatus 100 additionally comprises seal 132, which is in contact with piston 114 and barrel 104. Apparatus 100 also comprises drive system 148 that is configured to selectively control movement of piston 114 between the retracted position and the extended position. According to method 1000, (block 1004) forming the hermetically sealed chamber around ingot 110 comprises (block 1016) positioning housing 102 in the open state such that lid 128 of receptacle 108 is not in contact with a portion of gasket 130, which is in contact with both lid 128 and barrel 104 when housing 102 is in the closed state, (block 1018) with housing 102 in the open state, positioning ingot 110 in base 126 of receptacle 108, and, (block 1020) with de-gassing port 120 selectively closed, positioning housing 102 in the closed state such that housing 102 and piston 114 form a closed chamber around ingot 110 that is hermetically sealed via gasket 130 and seal 132. The preceding portion of this paragraph characterizes example thirty-three of the subject matter, disclosed herein, where example thirty-three also encompasses any one of examples twenty-four to thirty-two, above.

Apparatus 100 facilitates method 1000 and enables de-gassing and consolidation of ingot 110. De-gassing and consolidation of ingot 110 using apparatus 100 reduces or eliminates air pockets disposed within ingot 110 and minimizes porosity of the fiber-reinforced resin material.

Barrel 104 is configured to retain piston 114 and enable movement of piston 114 along symmetry axis 106 during de-gassing and consolidation. With housing 102 in the open state, receptacle 108 is configured to receive ingot 110. With housing 102 in the closed state, receptacle 108 is configured to hold ingot 110 during consolidation and de-gassing. With housing 102 in the closed state, housing 102 and piston 114 form the closed chamber, within which ingot 110 is enclosed during de-gassing and consolidation.

With housing 102 in the closed state, gasket 130 creates a gas-tight seal at the interface between base 126 and lid 128 and a gas-tight seal at the interface between lid 128 and barrel 104. With piston 114 in the retracted position and the extended position, seal 132 creates a gas-tight seal at the interface between piston 114 and barrel 104. With housing 102 in the closed state and with de-gassing port 120 selectively open, the vacuum can be applied within the closed chamber via de-gassing port 120 and the force can be applied to ingot 110. With piston 114 in the extended position, piston 114 facilitates application of the force to ingot 110 situated within the hermetically sealed chamber.

Referring generally to FIG. 15 and particularly to, e.g., FIGS. 1, 5, and 6 for illustrative purposes only and not by way of limitation, according to method 1000, apparatus 100 further comprises heating element 150 that is in thermal communication with receptacle 108. According to method 1000, (block 1002) heating ingot 110 to the predetermined temperature comprises (block 1022) heating receptacle 108 using heating element 150. The preceding portion of this paragraph characterizes example thirty-four of the subject matter, disclosed herein, where example thirty-four also encompasses example thirty-three, above.

Heating receptacle 108 facilitates heating ingot 110 within the hermetically sealed chamber to the predetermined temperature. In one or more examples, heating element 150 provides for application of heat to receptacle 108, which heats ingot 110 within the closed chamber to the predetermined temperature above room temperate. Heating of ingot 110 enables the fiber-reinforced resin material to become sufficiently soft to respond to subsequent vacuum de-gassing and consolidation.

Referring generally to FIG. 15 and particularly to, e.g., FIGS. 1, 5, and 6 for illustrative purposes only and not by way of limitation, according to method 1000, apparatus 100 further comprises temperature sensor 158 that is coupled to receptacle 108. According to method 1000, (block 1002) heating ingot 110 to the predetermined temperature comprises (block 1024) measuring a temperature of receptacle 108 using temperature sensor 158. The preceding portion of this paragraph characterizes example thirty-five of the subject matter, disclosed herein, where example thirty-five also encompasses example thirty-three or thirty-four, above.

Measuring the temperature of receptacle 108 enables determination of the temperature of ingot 110 within the hermetically sealed chamber and of receptacle 108 selective control of the temperature based on temperature measurements. In one or more examples, temperature sensor 158 is configured to detect the temperature of receptacle 108 and enables controller 116 to monitor and selectively control the temperature of receptacle 108 and, thus, the temperature of ingot 110.

Referring generally to FIG. 15 and particularly to, e.g., FIGS. 1, 5, and 6 for illustrative purposes only and not by way of limitation, according to method 1000, (block 1008) applying the force to ingot 110 comprises (block 1026) moving piston 114 from the retracted position to the extended position and (block 1028) compressing ingot 110 between piston 114 and receptacle 108. The preceding portion of this paragraph characterizes example thirty-six of the subject matter, disclosed herein, where example thirty-six also encompasses any one of examples thirty-three to thirty-five, above.

Moving piston 114 from the retracted position to the extended position provides the compression force applied to ingot 110. In one or more examples, drive system 148 supplies operational power and provides selective control to move piston 114 between the retracted position and the extended position by applying the force to piston 114. Piston 114 is configured to apply the force to ingot 110 when moved along symmetry axis 106 from the retracted position to the extended position. Applying the force to ingot 110 in the closed chamber using piston 114 compacts ingot 110 and urges gas trapped within ingot 110 toward the boundary layer for vacuum de-gassing.

Referring generally to FIG. 15 and particularly to, e.g., FIGS. 1, 5, and 6 for illustrative purposes only and not by way of limitation, method 1000 further comprises (block 1030) determining a force, applied to piston 114 by drive system 148. The force, applied to piston 114 by drive system 148, equals the force, applied to ingot 110 by piston 114. The preceding portion of this paragraph characterizes example thirty-seven of the subject matter, disclosed herein, where example thirty-seven also encompasses example thirty-six, above.

Determining the force applied to piston 114 by drive system 148 enables the force applied to ingot 110 by piston 114 to be empirically determined, monitored, and controlled. In one or more examples, the force, applied to piston 114 by drive system 148, being equal to the force, applied to ingot 110 by piston 114, eliminates a requirement for a sensing step to determine the force and resulting pressure, applied to ingot 110 during consolidation and vacuum de-gassing.

Referring generally to FIG. 15 and particularly to, e.g., FIG. 1 for illustrative purposes only and not by way of limitation, according to method 1000, drive system 148 comprises servomotor 174 that is coupled to piston 114. According to method 1000, (block 1030) determining the force, applied to piston 114 by drive system 148, comprises (block 1032) determining a torque, required by servomotor 174. The preceding portion of this paragraph characterizes example thirty-eight of the subject matter, disclosed herein, where example thirty-eight also encompasses example thirty-seven, above.

Use of servomotor 174 enables the force, applied to ingot 110 by piston 114, to be empirically determined based on the torque, required by servomotor 174. In one or more examples, the force, applied to piston 114 by drive system 148, being determined by the torque, required by servomotor 174, eliminates a requirement for a sensing step to determine the force and resulting pressure, applied to ingot 110 during consolidation and vacuum de-gassing.

Referring generally to FIG. 15 and particularly to, e.g., FIGS. 1, 5, and 6 for illustrative purposes only and not by way of limitation, according to method 1000, apparatus 100 further comprises vacuum system 146 that is coupled to de-gassing port 120. According to method 1000, (block 1006) applying the vacuum to ingot 110 comprises (block 1034) applying the vacuum within the hermetically sealed chamber using vacuum system 146 with de-gassing port 120 selectively open. The preceding portion of this paragraph characterizes example thirty-nine of the subject matter, disclosed herein, where example thirty-nine also encompasses any one of examples thirty-three to thirty-eight, above.

Vacuum system 146 provides for application of the vacuum within the closed chamber via de-gassing port 120. The vacuum, applied within the closed chamber, results in application of vacuum to at least a portion of a surface of ingot 110. Vacuum system 146 also provides for evacuation of gas from within the closed chamber via de-gassing port 12, such as air and/or other volatiles that escapes from ingot 110 during consolidation Referring generally to FIG. 15 and particularly to, e.g., FIGS. 1, and 2-4 for illustrative purposes only and not by way of limitation, according to method 1000, (block 1016) positioning housing 102 in the closed state comprises (block 1036) fastening lid 128 of receptacle 108 and base 126 of receptacle 108 together. The preceding portion of this paragraph characterizes example forty of the subject matter, disclosed herein, where example forty also encompasses any one of examples thirty-three to thirty-nine, above.

Fastening lid 128 of receptacle 108 and base 126 of receptacle 108 together enables housing 102 to be closed to form the hermetically sealed chamber around ingot 110 and enables receptacle 108 to react to internal pressure during vacuum de-gassing and consolidation. In one or more examples, housing 102 includes fastener 166. Fastener 166 is configured to releasably fasten lid 128 and base 126 together when housing 102 is in the closed state.

Referring generally to FIG. 15 and particularly to, e.g., FIGS. 1, 2-6, and 11-14 for illustrative purposes only and not by way of limitation, according to method 1000, base 126 comprises tapered base-end 122, opposite barrel 104 along symmetry axis 106, and lid 128 comprises tapered lid-end 124, opposite barrel 104 along symmetry axis 106. De-gassing port 120 is located on one of tapered base-end 122 or tapered lid-end 124. With housing 102 in closed state, tapered base-end 122 and tapered lid-end 124 collectively form tapered receptacle-end 118 of receptacle 108. Tapered receptacle-end 118 of receptacle 108 forms stop 192. According to method 1000, (block 1008) applying the force to ingot 110 abuts ingot-end surface 194 of ingot 110 against stop 192 such that headspace 196 is formed between ingot-end surface 194 and de-gassing port 120. According to method 1000, (block 1006) applying the vacuum to ingot 110 comprises (block 1038) applying the vacuum to ingot-end surface 194. The preceding portion of this paragraph characterizes example forty-one of the subject matter, disclosed herein, where example forty-one also encompasses any one of examples thirty-three to forty, above.

With housing 102 in the closed state, tapered receptacle-end 118 reduces the cross-sectional dimension of receptacle 108 such that tapered receptacle-end 118 forms stop 192 against which ingot-end surface 194 of ingot 110 is abutted when the force is applied to ingot 110 by piston 114. With housing 102 in the closed state, tapered receptacle-end 118 of receptacle 108 also provides headspace 196 formed between ingot-end surface 194 of ingot 110 and the de-gassing port 120. Situating de-gassing port 120 on one of tapered base-end 122 or tapered lid-end 124 enables application of the vacuum within the headspace 196 when ingot 110 is compressed against stop 192 by piston 114.

In one or more examples, consolidation of ingot 110 does not begin to occur until an end of ingot 110, opposite to an opposed end of ingot 110 in contact with piston 114, is in contact with stop 192 formed by tapered receptacle-end 118. In other words, during consolidation, ingot 110 is compressed between piston 114 and stop 192. Headspace 196 is a portion of an interior volume of the closed chamber that remains open (e.g., is not filled by ingot 110) during de-gassing and consolidation. Headspace 196 provides a volume for application of the vacuum to the hermetically sealed chamber and, thus, to ingot 110 while ingot 110 is being compressed by piston 114.

In one or more examples, as ingot 110 is compressed by piston 114 against stop 192 during consolidation, the diameter of ingot 110 increases until a circumferential surface of ingot 110 encounters the inner surface of receptacle 108, and the interior volume of the closed chamber is filled by ingot 110 and piston 114. At this point, headspace 196 provides a portion of the internal volume of the closed chamber that remains open and that is not filled by ingot 110. Situating de-gassing port 120 on one of tapered base-end 122 or tapered lid-end 124 enables application of the vacuum within headspace 196 and, thus, to at least ingot-end surface 194 of ingot 110 during consolidation.

Examples of the subject matter, disclosed herein may be described in the context of aircraft manufacturing and service method 1100 as shown in FIG. 31 and aircraft 1102 as shown in FIG. 32. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 32, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (blocks 1108 and 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A method of consolidating an ingot of fiber-reinforced resin material, the method comprising steps of:
accessing an apparatus for consolidating the ingot, wherein the apparatus comprises:
a housing, comprising:
a barrel, having a symmetry axis;
a receptacle, comprising:
a base, extending from the barrel along the symmetry axis and comprising a tapered base-end, opposite the barrel along the symmetry axis;
a lid, coupled to the base and selectively positionable relative to the base of the receptacle and relative to the barrel of the housing such that the housing is in an open state or in a closed state and comprising a tapered lid-end, opposite the barrel along the symmetry axis such that with the housing in the closed state, the tapered base-end and the tapered lid-end collectively form a tapered receptacle-end of the receptacle; and
a de-gassing port, located on the tapered receptacle-end of the receptable and configured to be selectively open or selectively closed;
a gasket that is in contact with the lid of the receptacle, the base of the receptacle, and the barrel when the housing is in the closed state;
a piston, movable along the symmetry axis between, inclusively, a retracted position, in which the piston, in its entirety, is in the barrel, and an extended position, in which a portion of the piston is in the receptacle and another portion of the piston is in the barrel;
a seal, which is in contact with the piston and the barrel; and
a piston drive, configured to selectively control movement of the piston between the retracted position and the extended position;
positioning the housing in the open state such that the lid of the receptacle is not in contact with a portion of the gasket, which is in contact with both the lid and the barrel when the housing is in the closed state;
with the housing in the open state, positioning the ingot in the base of the receptacle;
with the de-gassing port selectively closed, positioning the housing in the closed state such that the housing and the piston form a closed, hermetically sealed chamber around the ingot that is hermetically sealed via the gasket and the seal;
heating the ingot to a predetermined temperature above room temperature;
applying a vacuum to the ingot in the hermetically sealed chamber; and
applying a force to the ingot in the hermetically sealed chamber while applying the vacuum to the ingot.

2. The method according to claim 1, wherein the step of heating the ingot to the predetermined temperature precedes the step of forming the hermetically sealed chamber around the ingot.

3. The method according to claim 1, wherein the step of heating the ingot to the predetermined temperature follows the step of forming the hermetically sealed chamber around the ingot.

4. The method according to claim 1, wherein the step of applying the vacuum to the ingot precedes the step of applying the force to the ingot.

5. The method according to claim 4, further comprising maintaining the ingot at the predetermined temperature for a first predetermined time period while applying the vacuum to the ingot.

6. The method according to claim 5, further comprising maintaining the ingot at the predetermined temperature for a second predetermined time period while applying the vacuum to the ingot and applying the force to the ingot.

7. The method according to claim 1, wherein the predetermined temperature is from 120 degrees to 150 degrees Fahrenheit.

8. The method according to claim 1, wherein the force, applied to the ingot, results in a pressure, ranging from 600 psi to 1,000 psi, applied to the ingot.

9. The method according to claim 1, wherein the vacuum, applied to the ingot, is between −28 in-Hg and −30 in-Hg.

10. The method according to claim 1, wherein:
the apparatus further comprises a heating element that is in thermal communication with the receptacle; and
the step of heating the ingot to the predetermined temperature comprises heating the receptacle using the heating element.

11. The method according to claim 1, wherein:
the apparatus further comprises a temperature sensor that is coupled to the receptacle; and
the step of heating the ingot to the predetermined temperature comprises measuring a temperature of the receptacle using the temperature sensor.

12. The method according to claim 1, wherein the step of applying the force to the ingot comprises:
moving the piston from the retracted position to the extended position; and
compressing the ingot between the piston and the receptacle.

13. The method according to claim 12, further comprising a step of determining a force, applied to the piston by the drive system, wherein the force, applied to the piston by the drive system, equals the force, applied to the ingot by the piston.

14. The method according to claim 13, wherein:
the drive system comprises a servomotor that is coupled to the piston; and
the step of determining the force, applied to the piston by the drive system, comprises determining a torque, required by the servomotor.

15. The method according to claim 1, wherein the apparatus further comprises a vacuum system that is coupled to the de-gassing port.

16. The method according to claim 15, wherein the step of applying the vacuum to the ingot comprises applying the vacuum within the hermetically sealed chamber using the vacuum system with the de-gassing port selectively open.

17. The method according to claim 1, wherein positioning the housing in the closed state comprises fastening the lid of the receptacle and the base of the receptacle together.

18. The method according to claim 1, wherein:
the tapered receptacle-end of the receptacle forms a stop;
the step of applying the force to the ingot abuts an ingot-end surface of the ingot against the stop such that a headspace is formed between the ingot-end surface and the de-gassing port; and
the step of applying the vacuum to the ingot comprises applying the vacuum to the ingot-end surface.

19. A method of consolidating an ingot of fiber-reinforced resin material, the method comprising steps of:
accessing an apparatus for consolidating the ingot, wherein:

the apparatus comprises a housing and a piston;
the housing comprises a barrel and a receptacle;
the receptacle comprises a base, a lid, and a de-gassing port;
the base of the receptacle extends from the barrel along a symmetry axis and comprises a tapered base-end that is opposite the barrel along the symmetry axis;
the lid of the receptacle is coupled to the base and comprising a tapered lid-end that is opposite the barrel along the symmetry axis;
the lid is selectively positionable relative to the base and the barrel such that the apparatus is in an open state or in a closed state;
in the closed state, the tapered base-end and the tapered lid-end collectively form a tapered receptacle-end of the receptacle;
the de-gassing port is located on the tapered receptacle-end of the receptable and is configured to be selectively open or selectively closed; and
the piston is movable along the symmetry axis between, inclusively, a retracted position, in which the piston, in its entirety, is in the barrel, and an extended position, in which a portion of the piston is in the receptacle and another portion of the piston is in the barrel;

positioning the apparatus is in the open state;
with the apparatus in the open state, positioning the ingot in the base;
with the de-gassing port selectively closed, positioning the apparatus in the closed state such that the housing and the piston form a closed, hermetically sealed chamber around the ingot;
with the de-gassing port selectively open, applying a vacuum to the ingot in the hermetically sealed chamber;
moving the piston from the retracted position to the extended position such that the ingot is compressed between the piston and the receptacle.

20. The method of claim 19, wherein:

the tapered receptacle-end of the receptacle forms a stop;

the step of moving the piston abuts an ingot-end surface of the ingot against the stop such that a headspace is formed between the ingot-end surface and the de-gassing port; and the step of applying the vacuum to the ingot comprises applying the vacuum to the ingot-end surface.

* * * * *